United States Patent
Kishi et al.

(10) Patent No.: US 7,969,598 B2
(45) Date of Patent: Jun. 28, 2011

(54) INFORMATION PROCESSING APPARATUS, SYSTEM AND CONTROL METHOD THEREOF, PROGRAM, AND STORAGE MEDIUM FOR DOCUMENT MANAGEMENT

(75) Inventors: Kazuya Kishi, Kanagawa-ken (JP); Junichi Hayashi, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 933 days.

(21) Appl. No.: 11/561,938

(22) Filed: Nov. 21, 2006

(65) Prior Publication Data

US 2007/0118569 A1    May 24, 2007

(30) Foreign Application Priority Data

Nov. 24, 2005    (JP) ................................. 2005-339212

(51) Int. Cl.
*G06F 3/12* (2006.01)
(52) U.S. Cl. ...................... 358/1.15; 358/1.16; 358/1.14; 358/1.18; 707/661; 707/609
(58) Field of Classification Search .................. 358/400, 358/403, 1.15, 1.16, 1.14; 707/1, 200, 102, 707/661, 609
See application file for complete search history.

(56) References Cited

U.S. PATENT DOCUMENTS

| 2004/0168058 | A1* | 8/2004 | Margolus | 713/158 |
| 2005/0195446 | A1* | 9/2005 | Kasatani | 358/402 |
| 2005/0254080 | A1* | 11/2005 | Kim | 358/1.13 |

FOREIGN PATENT DOCUMENTS

| JP | 02-072477 | | 3/1990 |
| JP | 05-324421 | * | 12/1993 |
| JP | 07-028935 | | 1/1995 |

* cited by examiner

*Primary Examiner* — Benny Q Tieu
*Assistant Examiner* — Martin Mushambo
(74) *Attorney, Agent, or Firm* — Cowan, Liebowitz & Latman, P.C.

(57) ABSTRACT

An information processing apparatus includes a scanning unit adapted to scan an image of a document, a detection unit adapted to detect a document type by analyzing image data of the document scanned by the scanning unit, a storage unit adapted to store a storage period for each document type, a calculation unit adapted to calculate an expiration date for storage of the image data based on the storage period corresponding to the document type detected by the detection unit, and a management control unit adapted to manage the image data based on the calculated expiration date for storage.

4 Claims, 19 Drawing Sheets

INFORMATION PROCESSING APPARATUS, SYSTEM AND CONTROL METHOD THEREOF, PROGRAM, AND STORAGE MEDIUM FOR DOCUMENT MANAGEMENT

BACKGROUND OF THE INVENTION

1. Field of the Invention

The present invention relates to a document management technique and, more particularly, to a document management technique for managing documents based on their storage periods.

2. Description of the Related Art

Since electronic data are sanctioned as legally valid official documents according to the e-Document Law, the opportunity to convert and manage a large volume of paper document information into electronic data is assumed to increase in the future. In general, in a document management system that records and manages electronic data on a storage medium, a heavier load is imposed on the system user upon management of electronic data and resource prerequisites associated with information processing required for the document management system increase with increasing the number of electronic data to be managed. One of the factors that imposes a heavier load on the user is continuing storage of electronic data which no longer needs to be stored. For example, costs associated with access to desired electronic data increases with increasing amount of electronic data. The problem of the resource prerequisites of the document management system includes the following problem. That is, when unnecessary electronic data are kept stored without deletion, the storage medium cannot be efficiently used, and must be expanded by increasing the number of unnecessary electronic data.

To solve these problems, a technique for automatically executing document management processing by respectively detecting storage periods of electronic data stored in large quantities, and automatically deleting document data based on lapse of storage periods is required. Japanese Patent Laid-Open No. 5-324421 discloses a configuration that sets storage periods for respective document data and, for example, deletes document data according to detection of expiration of the storage periods.

However, such conventional configuration requires manual setting and management of the storage periods for respective documents in advance, resulting in a hassle.

Document data have various storage periods depending on their type, and some document data have legally-defined storage periods. For example, when a document archived as a paper medium is converted into an electronic document by, e.g., scanning, and that electronic document is managed, the storage period of the electronic document must be calculated in consideration of the period in which that document was archived as the paper medium. For example, when a document that has a storage period of five years and was stored as a paper document for three years is scanned, the storage period as an electronic document must be calculated and set, resulting in time-consuming operations. Upon changing the storage period of each document due to, e.g., amendment of the law, the user must manually set the storage periods again.

SUMMARY OF THE INVENTION

The present invention has been made in consideration of the above problems, and has as its object to provide a document management technique that reduces the user's manual operations including setting and management of document storage periods.

An information processing apparatus according to the present invention comprises the following arrangement. That is, an information processing apparatus comprises: a scanning unit adapted to scan an image of the document; a detection unit adapted to detect a document type by analyzing image data of the document scanned by the scanning unit; a storage unit adapted to record a storage period for each document type; a calculation unit adapted to calculate an expiration date for storage of the image data based on the storage period corresponding to the document type detected by the detection unit; and a management control unit adapted to manage the image data based on the calculated expiration date for storage.

Further features of the present invention will become apparent from the following description of exemplary embodiments with reference to the attached drawings.

DESCRIPTION OF THE EMBODIMENTS

Preferred embodiments of the present invention will be described in detail hereinafter with reference to the accompanying drawings. However, the building components described in these embodiments are merely examples, and do not limit the scope of the present invention.

First Embodiment (System Arrangement)

Figure 1:
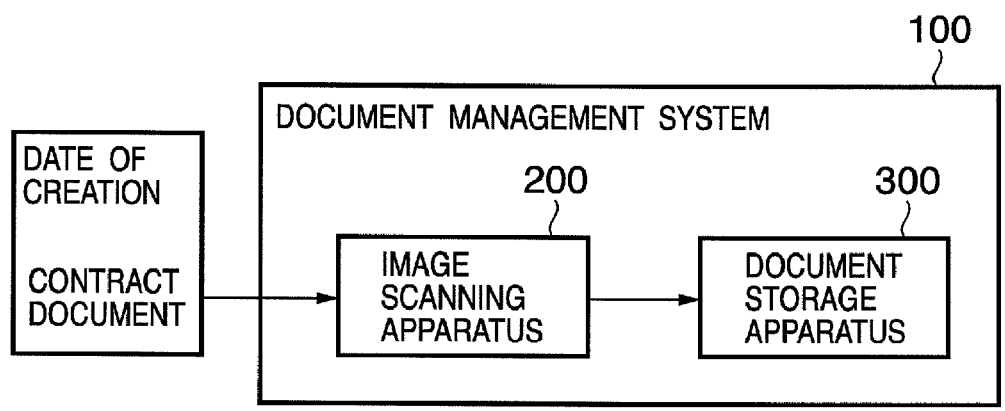
FIG. 1 is a block diagram showing the arrangement of a document management system.

FIG. 1 is a block diagram showing the arrangement of a document management system according to this embodiment. As shown in FIG. 1, a document management system 100 comprises an image scanning apparatus 200 and document storage apparatus 300. The document management system 100 is implemented by an information processing apparatus such as a personal computer (PC) workstation (WS), multi-functional peripheral equipment (MFP), or the like.

(Hardware Arrangement)

Figure 19:
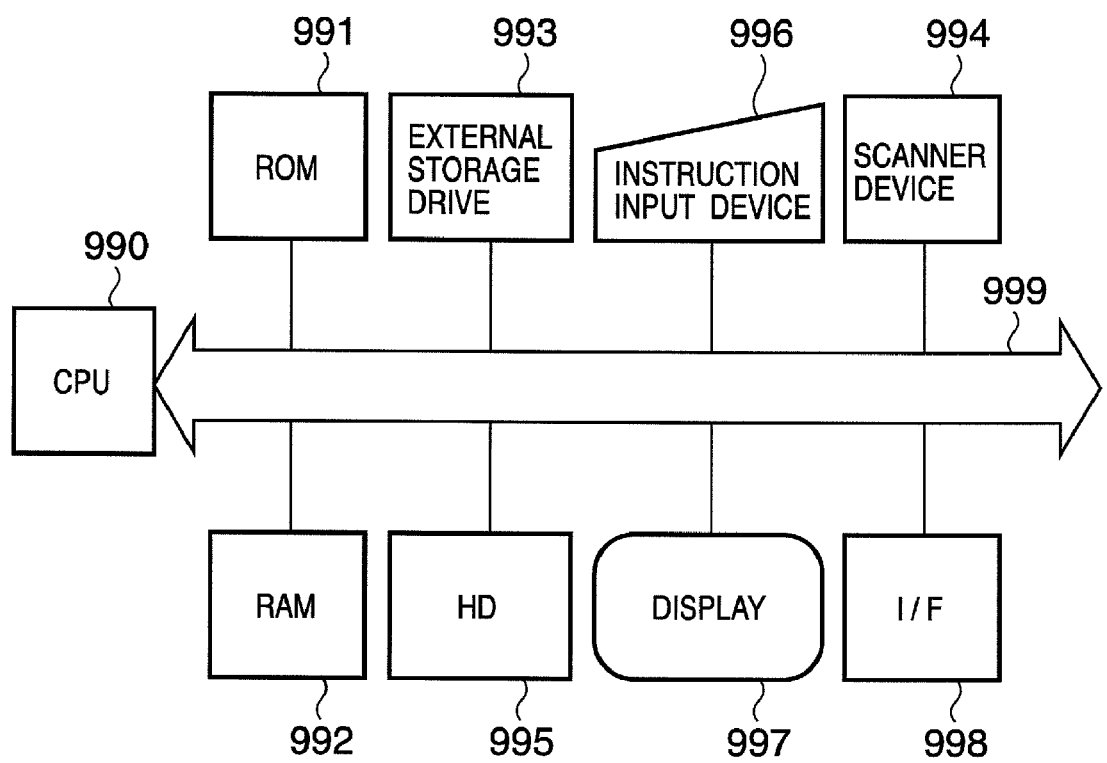
FIG. 19 is a block diagram showing the hardware arrangement of an information processing apparatus that implements the document management system.

The hardware arrangement of the information processing apparatus which implements the document management system 100 will be described below with reference to FIG. 19. FIG. 19 is a block diagram showing the hardware arrangement of the information processing apparatus that implements the document management system 100.

Referring to FIG. 19, reference numeral 990 denotes a CPU which executes application programs, an operating system (OS), control programs, and the like stored on a hard disk device (to be referred to as an HD hereinafter) 995. Also, the CPU 990 makes control for temporarily storing information, files, and the like required to execute programs on a RAM 992.

Reference numeral 991 denotes a ROM which stores programs such as a basic I/O program, and various data such as font data, template data, and the like used in basic processing. Reference numeral 992 denotes a RAM which temporarily stores various data, and serves as a main memory, work area, and the like of the CPU 990.

Reference numeral 993 denotes an external storage device which implements access to media (a recording medium), and can load programs and the like stored in a medium (recording medium) to this computer system. The media include a flexible disk (FD), CD-ROM, CD-R, CD-RW, PC card, DVD, IC memory card, MO, stick memory, and the like.

Reference numeral 994 denotes a scanner device which has the function of optically scanning a document set on a scanner unit and acquiring image data.

Reference numeral 995 denotes an external storage device which uses an HD serving as a large-capacity memory in this embodiment. The HD 995 stores the application programs, OS, control programs, related programs, and the like.

Reference numeral 996 denotes an instruction input device which corresponds to a keyboard, pointing device (mouse or the like), touch panel, and the like. The user inputs to the information processing apparatus, according to this embodiment, commands and the like for controlling the apparatus using the instruction input device 996.

Reference numeral 997 denotes a display which displays commands inputted by the instruction input device 996, response outputs of the information processing apparatus to these commands, and the like.

Reference numeral 999 denotes a system bus which controls the data flow in the information processing apparatus. Reference numeral 998 denotes an interface (to be referred to as an I/F hereinafter). The information processing apparatus exchanges data with external apparatuses via this I/F 998.

Note that software which implements functions equivalent to those of the aforementioned devices can replace the hardware devices.

In the example of this embodiment, the program and related data according to this embodiment are directly loaded from the media onto the RAM 992 and are executed. For example, every time the program according to this embodiment is to be run, that program may be loaded from the HD 995 in which the program has already been installed onto the RAM 992. Alternatively, the program according to this embodiment may be recorded in the ROM 991 to form a memory map, and may be directly executed by the CPU 990.

This embodiment will explain, for the sake of simplicity, the arrangement which implements the information processing apparatus by one apparatus. However, an arrangement which distributes resources to a plurality of apparatuses may implement the information processing apparatus. For example, an arrangement which distributes storage and arithmetic operation resources to a plurality of apparatuses may implement the information processing apparatus. Alternatively, resources may be distributed to virtual building components implemented on the information processing apparatus to achieve parallel processing. This embodiment will explain the image scanning apparatus 200 and document storage apparatus 300 as independent information processing apparatuses for the sake of descriptive convenience. Of course, the overall document management system 100 may be implemented by one information processing apparatus.

(Functional Arrangement of Image Scanning Apparatus 200)

Figure 2:
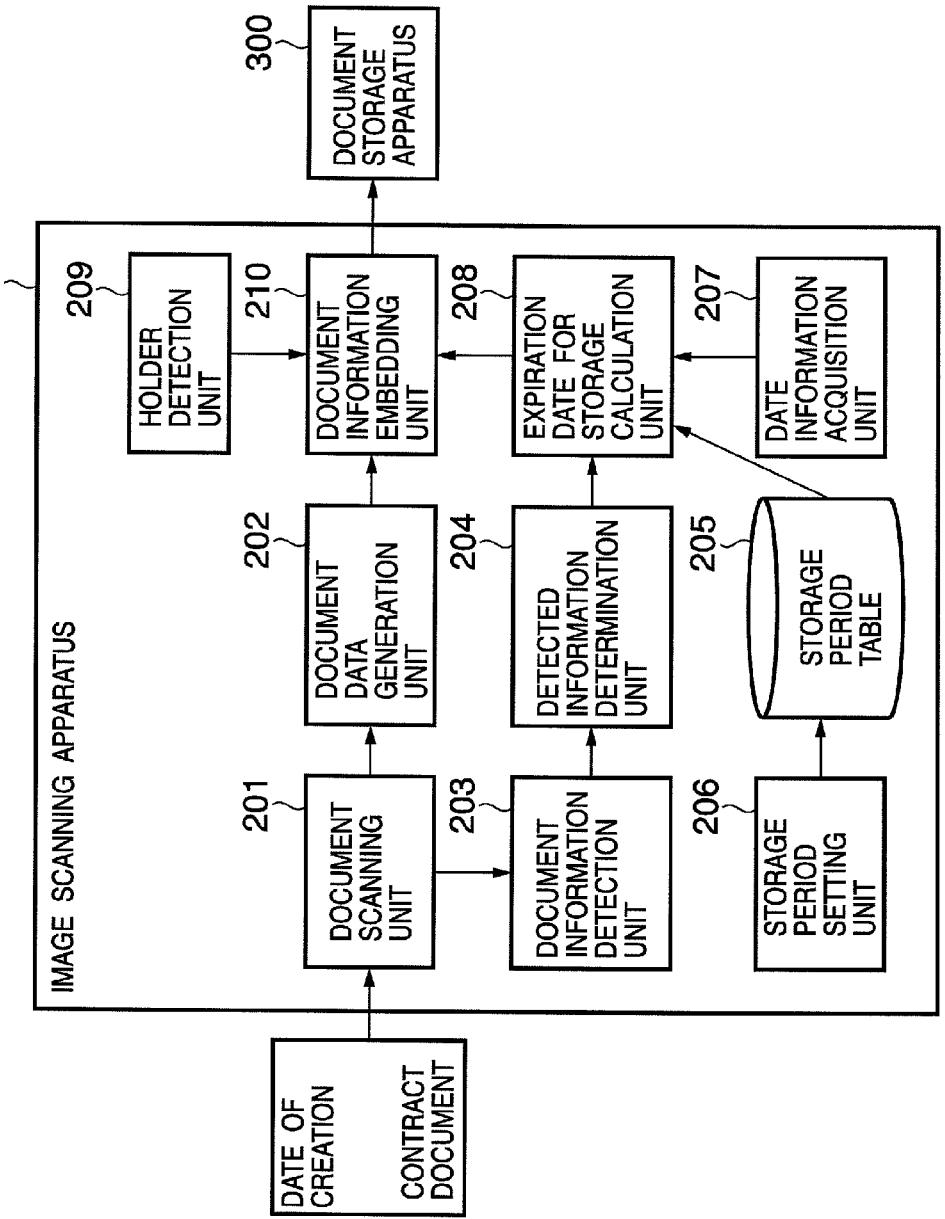
FIG. 2 is a block diagram showing the functional arrangement of an image scanning apparatus.

The functional arrangement of the image scanning apparatus 200 will be described below with reference to FIG. 2. FIG. 2 is a block diagram showing the functional arrangement of the image scanning apparatus 200. As shown in FIG. 2, the image scanning apparatus 200 comprises the following components:

a document scanning unit 201;
a document data generation unit 202;
a document information detection unit 203;
a detected information determination unit 204;
a storage period table 205;
a storage period setting unit 206;
a date information acquisition unit 207;
an expiration date for storage calculation unit 208;
a holder detection unit 209; and
a document information embedding unit 210.

Respective functional blocks shown in FIG. 2 are implemented when the CPU 990 of the information processing apparatus described above with reference to FIG. 19 executes the programs loaded onto the RAM 992 in collaboration with the respective hardware components shown in FIG. 19. Of course, some or all of the functional blocks may be implemented by dedicated hardware.

The document scanning unit 201 acquires a scanned image by optically scanning a document to be stored, and comprises, e.g., the scanner device 994. The document data generation unit 202 generates electronic data such as bitmap data, PDF data, or the like based on the image of the document scanned by the document scanning unit 201.

The document information detection unit 203 and detected information determination unit 204 detect the type (contract document, receipt, etc.) of document and document information such as date of creation of the document and the like. The document information detection unit 203 and detected information determination unit 204 detect document information by analyzing image data in cooperation with each other. For example, these units can exploit techniques using an OCR (Optical Character Reader) and layout information (Japanese Patent Laid-Open No. 2-72477 and Japanese Patent Laid-Open No. 7-28935). The technique using the OCR detects character strings that specify the document type from bitmap data, and determines the document type and date of creation based on the size, position, the number of times of appearance, and the like of the detected character strings. Note that the character strings include those used to specify the type, such as a bill, receipt, and the like, and those that can specify the date of creation (e.g., Jun. 28, 2005) and the like. The technique using the layout information specifies the document type by comparing layout information that is prepared in advance for each document type with the layout of the scanned document, and specifies the date of creation by recognizing characters in a predetermined field in that layout.

The storage period table 205 stores the settings of the document types, and the storage periods corresponding to the types. The storage period setting unit 206 has the function of setting the types and storage periods of documents of the storage period table 205. The storage period table 205 and its setting will be described later.

The date information acquisition unit 207 has the function of acquiring accurate standard date and time by a wave clock or the like. The expiration date for storage calculation unit 208 has the function of calculating an expiration date for storage of a document based on the type and date of creation of the document, information in the storage period table, and the like. The holder detection unit 209 has the function of specifying a holder of the scanned document using the authentication function of the image scanning apparatus such as an NFP or the detection function of the document information detection unit 203.

The document information embedding unit 210 has the function of embedding (appending), in electronic data generated by the document data generation unit 202, information obtained by the document information detection unit 203, expiration date for storage calculation unit 208, and holder detection unit 209. The information can be embedded by storing the information in the header of electronic data or using a digital watermark.

(Functional Arrangement of Document Storage Apparatus 300)

Figure 3:
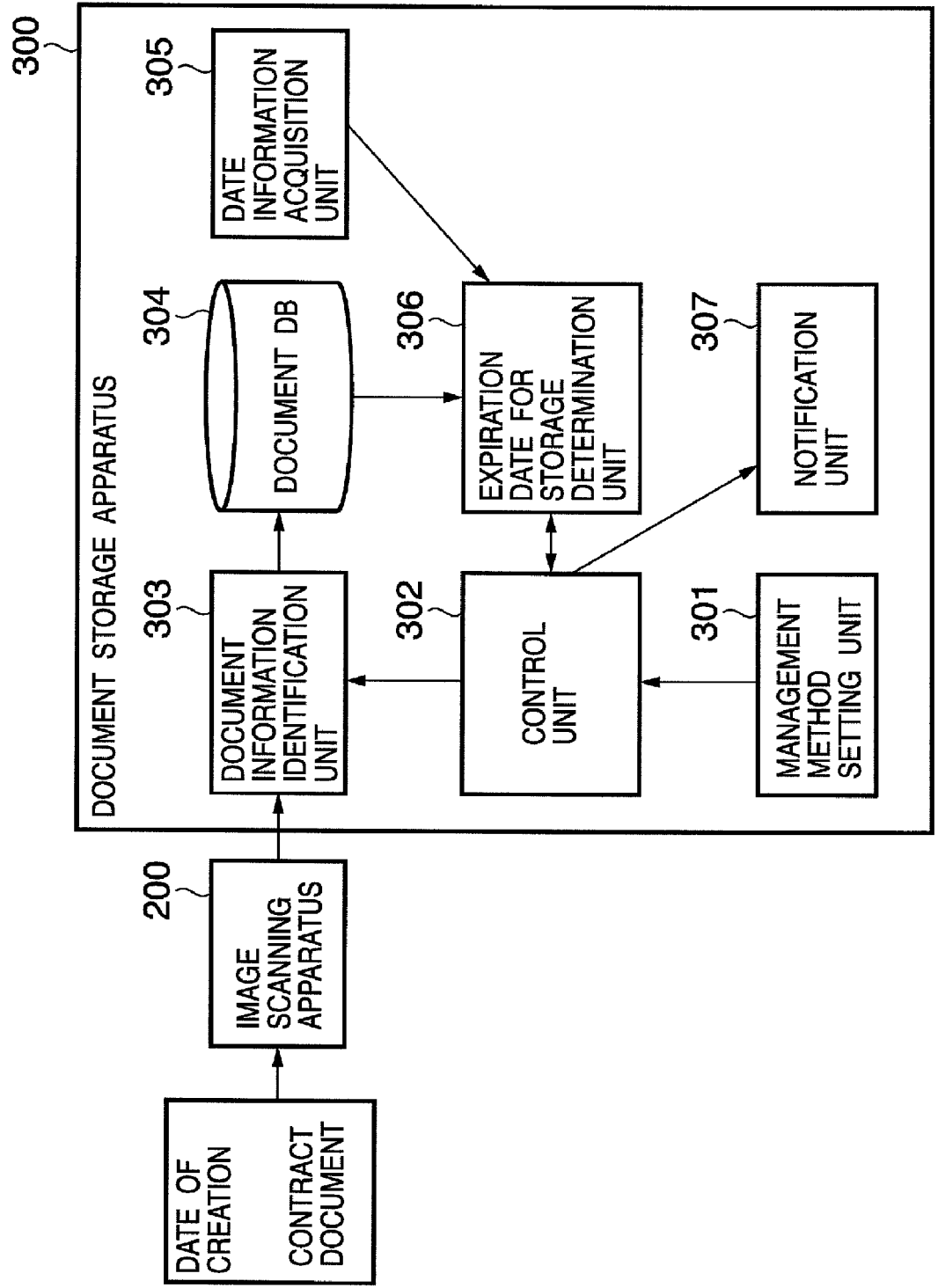
FIG. 3 is a block diagram showing the functional arrangement of a document storage apparatus.

The functional arrangement of the document storage apparatus 300 will be described below with reference to FIG. 3. FIG. 3 is a block diagram showing the functional arrangement of the document storage apparatus 300. As shown in FIG. 3, the document storage apparatus 300 comprises a management method setting unit 301, control unit 302, document information identification unit 303, document DB 304, date information acquisition unit 305, expiration date for storage checking unit 306, and notification unit 307.

Respective functional blocks shown in FIG. 3 are also implemented when the CPU 990 of the information processing apparatus described above with reference to FIG. 19 executes the programs loaded onto the RAM 992 in cooperation with the respective hardware components shown in FIG. 19. Of course, some or all of the functional blocks may be implemented by dedicated hardware.

The management method setting unit 301 accepts the settings associated with a document management method. The settings associated with the document management method include the classified storage of documents, checking the cycle of the expiration dates for storage, processing document contents, and the like. Note that the processing of document contents are to be done when the expiration date for storage checking unit 306 determines that the expiration date for storage of a given document has expired, and include deletion of a document, extension of storage, notification of a document holder, and the like.

The control unit 302 has the function of controlling the document management method based on the settings accepted by the management method setting unit 301. The document information identification unit 303 identifies information to classify and store documents. The document DB (database) has the function of classifying and storing documents.

The date information acquisition unit 305 has the function of acquiring accurate standard date and time by a wave clock or the like. The expiration date for storage checking unit 306 compares the expiration date for storage calculated by the expiration date for storage calculation unit 207 with the current date acquired by the date information acquisition unit 305 to determine in the cycle set by the management method setting unit 301 if the expiration date for storage has expired. The notification unit 307 has the function of notifying the document holder when the control unit 302 controls for making notification to the document holder.

(Document Scanning Processing)

The document scanning processing to be executed by the image scanning apparatus 200 in the aforementioned document management system 100 according to this embodiment will be described below.

Figure 4:
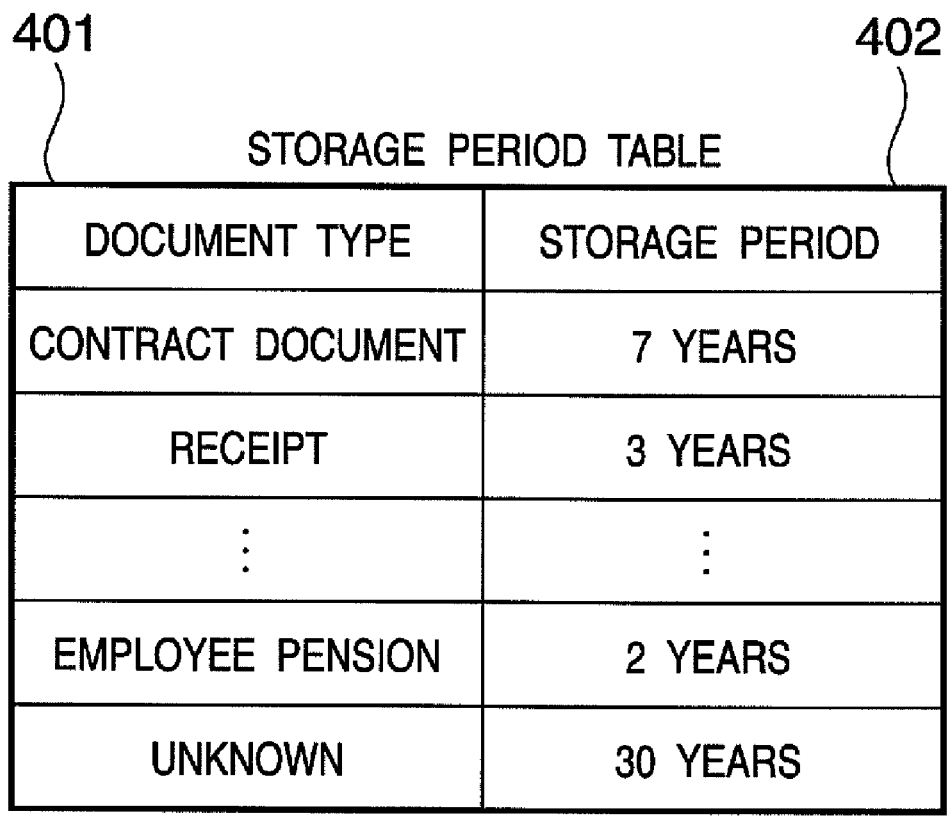
FIG. 4 is a view showing an example of the data configuration of a storage period setting table.

As pre-processing of the document scanning processing, the storage period table 205 is set. The storage period table 205 stores settings of the document types and storage periods corresponding to the types. FIG. 4 shows the data configuration of the storage period table 205. As shown in FIG. 4, the storage period table 205 indicates the correspondence between document types 401 and storage periods 402. The storage period table 205 stores settings of the storage periods 402 for respective document types 401 (for example, 7 years for a contract document and 3 years for a receipt).

To prepare for a case wherein the document information detection unit 203 fails to detect the document type, a storage period for an unknown document type must be set. For this purpose, as shown in FIG. 4, a document type is set as unknown, and a sufficiently long period (the legally-defined longest storage period) or indefinite period is set as the storage period. With this configuration, a document whose storage duty still remains can be prevented from being deleted.

The expiration date for storage calculation unit 208 calculates the expiration date for storage of a document with reference to this storage period table 205. For this reason, the user of the document management system 100 must set the storage period table 205 in advance. The user can set the storage period table 205 via the storage period setting unit 206. The storage period setting unit 206 provides a user interface that allows the user to make easy setting of the storage period table 205. The image scanning apparatus 200 allows the user to make settings such as registration, change, deletion, and the like of the storage periods via the storage period setting unit 206 at anytime as needed. The user of the document management system 100 registers the document types and storage periods corresponding to these types in advance via the storage period setting unit 206.

Figure 5:
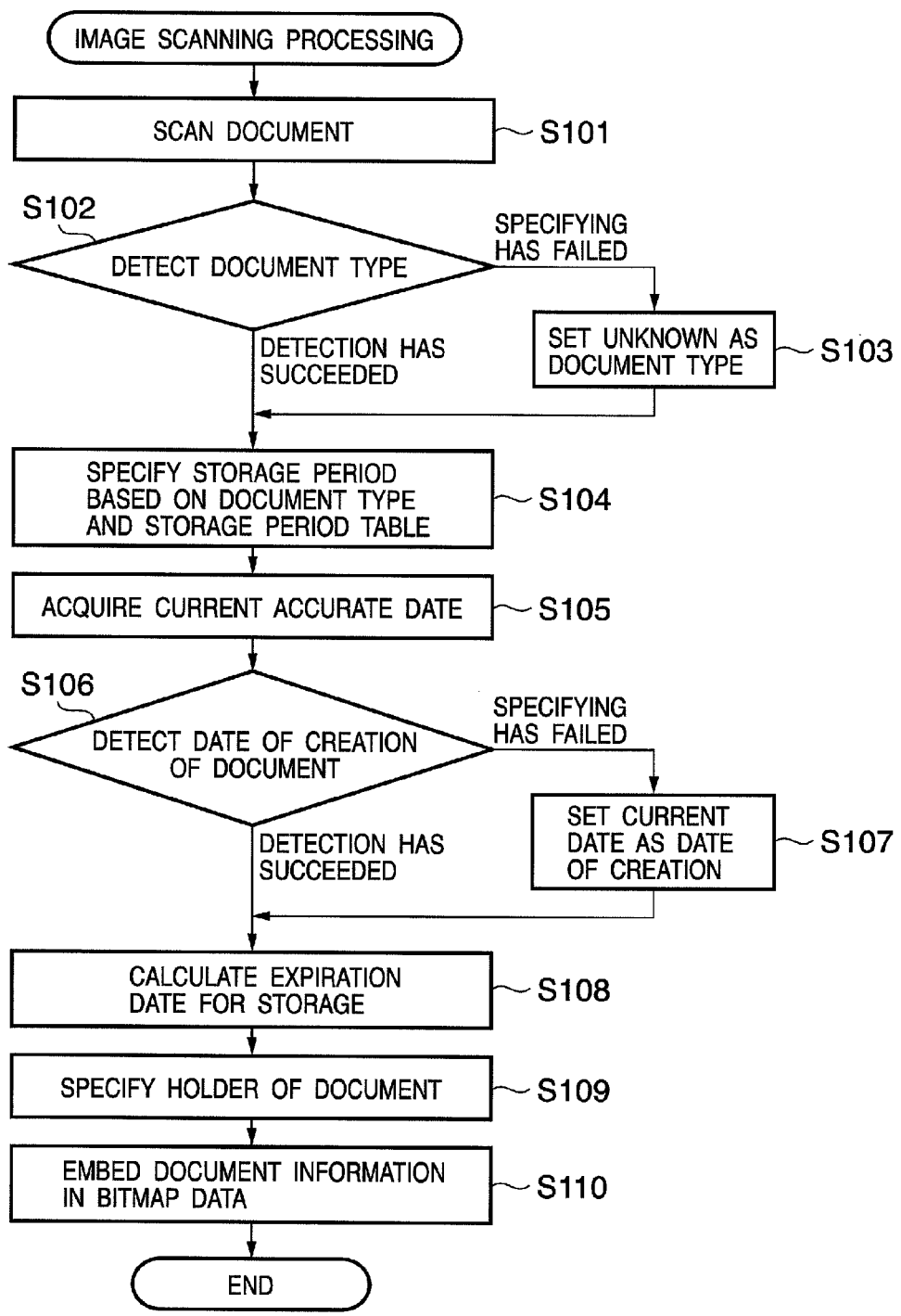
FIG. 5 is a flowchart showing the procedure of document scanning processing.

The sequence of the document scanning processing to be executed by the image scanning apparatus 100 will be described below with reference to the flowchart shown in FIG. 5. FIG. 5 is a flowchart showing the procedure of the document scanning processing.

The document scanning unit 201 scans a document based on the instruction input of a document holder (step S101). The document is scanned using an image input device such as the scanner device 994 or the like. At this time, the document data generation unit 202 generates bitmap data based on information scanned by the document scanning unit 201.

After the document is scanned by the document scanning unit 201, the document information detection unit 203 and detected information determination unit 204 detect the document type (step S102). The document type detection technique may use technique using OCR or the layout information. The document type detection is executed so as to detect one of the types set in the storage period (setting) table 205. For example, the type such as a contract document, receipt, or the like is detected.

If detection of the document type has failed ("specifying has failed" in step S102), the process advances to step S103 to detect the document type as "unknown". The process then advances to step S104. If detection of the document type has succeeded in step S102 ("detection has succeeded" in step S102), the process also advances to step S104.

In step S104, the expiration date for storage calculation unit 208 searches the storage period table 205 based on the document type detected in step S102 or S103, and specifies a storage period corresponding to the document type.

After the document storage period is specified, the image scanning apparatus 200 acquires a current accurate date using the date information acquisition unit 207 (step S105). The date information acquisition unit 207 provides accurate standard time information. The date information acquisition unit 207 can be implemented using an authentication server that provides a time stamp service, GPS (Global Positioning System), wave clock, NTP (Network Time Protocol), or the like. Since these techniques are known to those who are skilled in the art, a detailed description thereof will be omitted. The date can include accurate time information in addition to information on year, month, and day.

After the accurate date is acquired in step S105, the document information detection unit 203 attempts to detect the date of creation of the document (step S106). The date of creation can be detected using the OCR or layout information as in step S102. The detection process is executed so that the information on the date of creation of the document includes information of year/month/day. As a result of the processing in step S10, if detection of the date of creation of the document has failed ("specifying has failed" in step S106), the process advances to step S107 to set the date of scanning of that document as its date of creation. The process then advances to step S108. If detection of the date of creation of the document has succeeded ("detection has succeeded" in step S106), the process also advances to step S108.

In step S108, the expiration date for storage calculation unit 208 calculates an expiration date for storage based on the date of creation of the document specified in step S106 or S107 and the storage period specified in step S104. The expiration date for storage can be calculated by adding the storage period specified in step S104 to the specified date of creation of the document.

The holder detection unit 209 detects information representing the holder of the scanned document (step S109). Detection of the information representing the holder of the document may be through the authentication function of the image scanning apparatus 200 such as an ID, password input, and the like, or the document information detection unit 203 may detect information representing the holder of the document as in the document type and date of creation. The information representing the holder of the document can include the name and contact address (e.g., an e-mail address or the like) of the holder of the document. With the arrangement according to this embodiment, the information representing the holder of the document is used to, e.g., notify the holder that the document whose storage period has expired if such document is found. For this reason, the information representing the holder of the document need not always be his or her contact address as long as a notified party who requires contact upon elapse of the storage period of the document can be specified. Note that such function is not indispensable, and the processing in step S109 can be omitted if it is not particularly required.

After the processing in step S109, the document information embedding unit 210 embeds (appends) document information such as the detected document type, date of creation, expiration date for storage, and holder in the bitmap data generated by the document data generation unit 202 in step S110. The document information can be embedded by storing the document information in the header of the bitmap data. Alternatively, the document information may be embedded using a digital watermarking technique or the like. After the document information embedding processing, the bitmap data appended with the document information is output to the document storage apparatus 300, thus ending the process.

(Overview of Document Management)

The document storage apparatus 300 of the document management system 100 in this embodiment will be described below. The document storage apparatus 300 has as its object to manage documents, and has three principal functions, i.e., management method setting, document storage, and checking of an expiration date for storage. An overview of these document management functions will be explained first.

The management method setting function is a function of setting the document management method. In the arrangement according to this embodiment, the management method setting function includes the function enabling the setting of a document storage method and an expiration date for the storage checking method. The document storage function and expiration date for the storage checking function are those of storing a document or checking its expiration date for storage based on the contents set by the management method setting function. In this way, the document storage apparatus 300 manages documents in the form of setting the management method of a document as the management method setting function, storing the document based on the set management method as the document storage function, and processing the document by checking the expiration date for storage of the document as the expiration date for storage checking function. The management method setting function, document storage function, and expiration date for storage checking function will be described in detail below.

The management method setting function of a document will be described first. The document storage apparatus 300 sets the following three in advance when managing documents. The first is a classification method when storing documents, which includes whether documents are classified and stored in folders depending on their types or expiration dates for storage. The second is the processing to be done by the control unit 302 when the storage period of a document has elapsed. The processing method includes processing for automatically deleting a document, extending the storage period, notifying the holder of that fact, or the like. Finally, the third is the setting of a cycle for checking the expiration dates for storage of documents. The setting of the cycle for checking the expiration dates for storage sets a cycle for checking if the expiration date for storage has expired every day, week, month, or year. The management method setting unit 301 has the function of setting the document storage method. The control unit 302 controls the document management method and processing method based on the management method set by the management method setting unit 301. For this purpose, the user of the document management system 100 must set necessary information using the management method setting unit 301.

(Document Storage Processing)

Figure 6:
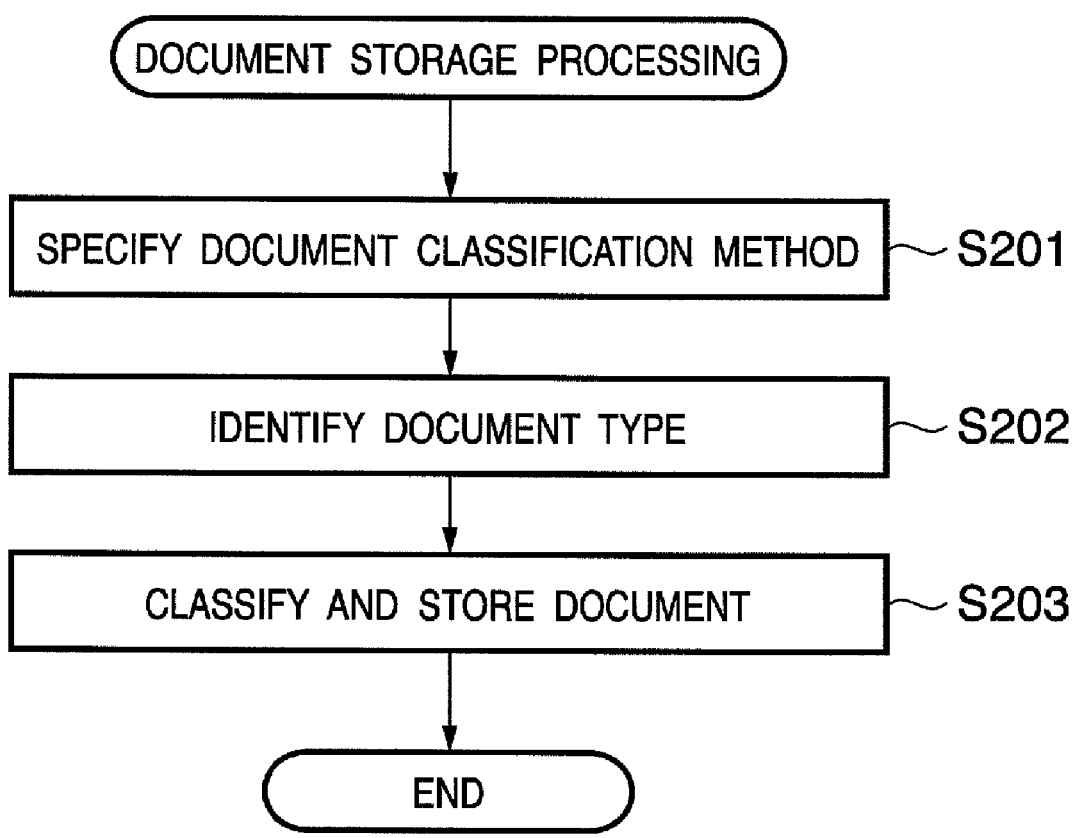
FIG. 6 is a flowchart showing the procedure of document storage processing.

The document storage process to be executed by the document storage apparatus 300 in the document management system 100 in this embodiment will be described below with reference to FIG. 6. FIG. 6 is a flowchart showing the procedure of the document storage process.

Upon receipt of a document output from the image scanning apparatus 200, the document storage apparatus 300 stores the received document. When the document storage apparatus 300 stores the document, it specifies the document classification method under the control of the control unit 302 (step S201). The control unit 302 specifies the classification method based on the setting made for the management method setting unit 301. The document classification method includes those depending on document types, expiration dates for storage, holders, and the like.

If the document classification method is specified in step S201, the document information identification unit 303 identifies document information appended to the document (step S202). For example, if the classification method is the type-dependent method, the document information identification unit 303 identifies whether the document type is a contract document, receipt, or the like.

If the document information is identified in step S202, the document is classified based on the identified information and is stored in the document DB 304 (step S203). If the classification method is document type-dependent or holder-dependent, a folder is generated for each document type or holder to store the document. If the classification method depends on the expiration date for the storage-dependent method, a folder may be generated for every month or year with respect to the expiration dates for storage to store the document.

(Expiration Date for the Storage Checking Process)

Figure 7:
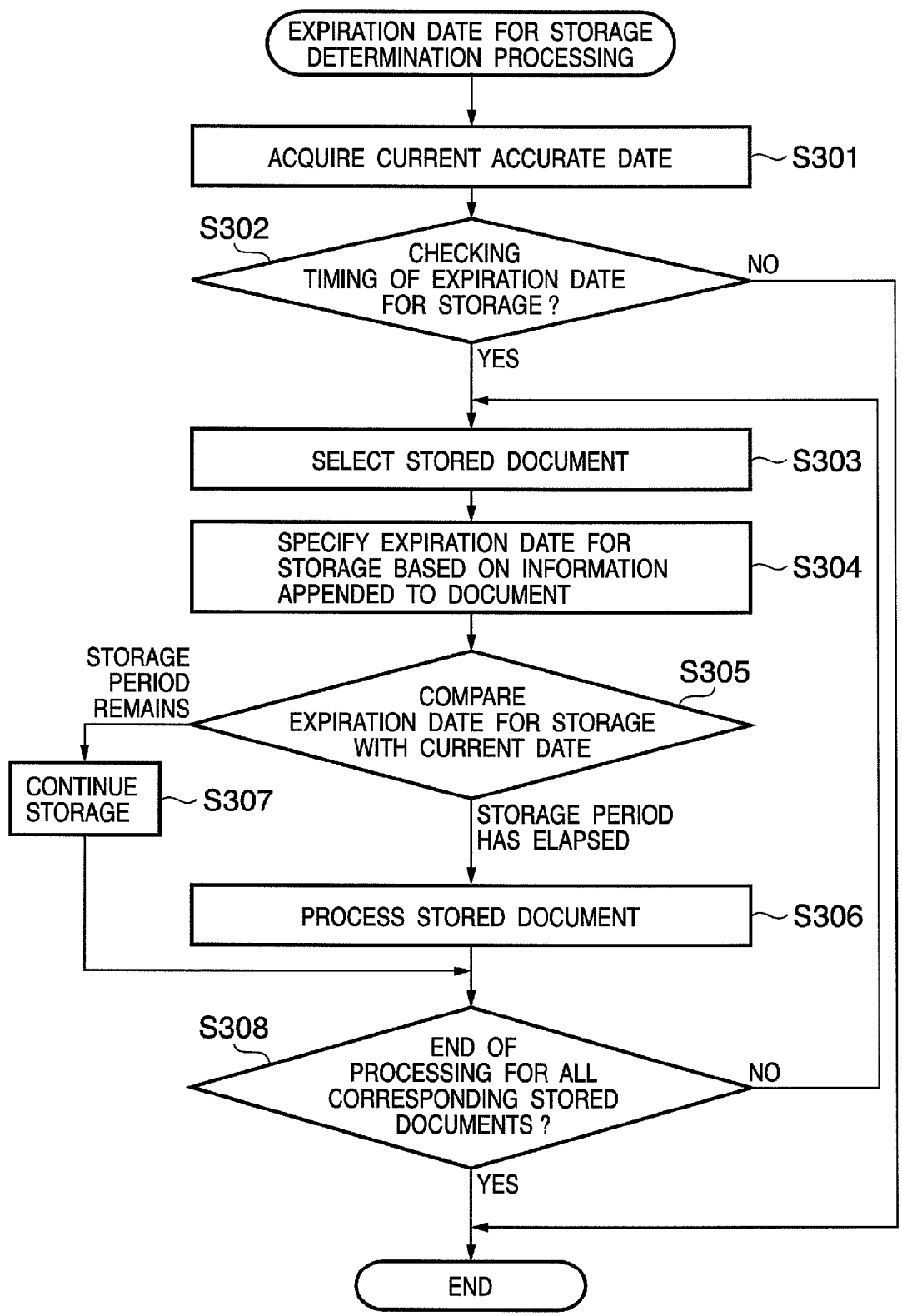
FIG. 7 is a flowchart showing the procedure for checking the expiration date for storage.

The expiration date the for storage checking process to be executed by the document storage apparatus 300 in the document management system 100 of this embodiment will be described below with reference to FIG. 7. FIG. 7 is a flowchart showing the procedure of the expiration date for the storage checking process. In this embodiment, assume that documents are classified and stored according to respective types.

The document storage apparatus 300 acquires the current accurate date using the date information acquisition unit 305 first (step S301). Note that the date may include time in addition to year, month, and day.

The document storage apparatus 300 checks if the checking timing of the expiration dates for storage has been reached (step S302). The control unit 302 controls whether or not the checking timing of the expiration dates for storage has been reached based on the storage cycle set by the management method setting unit 301. For example, if the storage cycle is set to be every day, the expiration dates for storage must be checked every day. If the storage cycle is set to be every year, the expiration dates for storage need only be checked once per year. As a result of checking the checking timing of the expiration date for storage, if it is determined that the checking timing is not reached (NO in step S302), the expiration date for storage checking processing ends. On the other hand, if it is determined in step S302 that the checking timing of the expiration dates for storage is reached (YES in step S302), the process advances to step S303.

In steps S303 to S308, the document storage apparatus 300 checks the expiration dates for storage of all documents stored in the document storage apparatus 300, i.e., it executes processing based on comparing results between their expiration dates for storage and execution dates of processing using the expiration date for storage checking unit 306.

The expiration date for storage checking unit 306 selects, one by one, stored documents which have not undergone processing based on the checking result of the expiration dates for storage (step S303). In this embodiment, documents are classified and stored according to respective types, and the expiration dates for storage of all the stored documents are checked.

The expiration date for storage checking unit 306 specifies the expiration date for storage from the document information stored in, e.g., the header or the like of the selected document (step S304).

If the expiration date for storage of the document is specified, the expiration date for storage checking unit 306 compares the current date acquired by the date information acquisition unit 305 with the expiration date for storage (step S305). If the current date has passed the expiration date for storage ("storage period has elapsed" in step S305), the process advances to step S306; otherwise ("storage period remains" in step S305), the process advances to step S307.

In step S307, the document storage apparatus 300 continues storage of the document. That is, the document storage apparatus 300 does not especially execute processing while the document is stored in the storage device. The process then advances to step S308.

On the other hand, in step S306 the document storage apparatus 300 processes the document in accordance with the control information of the control unit 302. As the processing method of the document, for example, the document may be automatically deleted, the storage period of that document may be extended, or if the holder detection unit 209 has specified the holder, the apparatus may notify the holder using an e-mail message or the like. The process then advances to step S308.

The document storage apparatus 300 checks in step S308 if the expiration dates for storage of all stored documents have been checked, i.e., the processes in steps S304 to S307 have been executed for them. If checking of the expiration dates for storage of all the stored documents is complete (YES in step S308), all the processes end.

If documents whose expiration dates for storage are to be checked still remain (NO in step S308), the process returns to step S303 to check the expiration date for storage of the next stored document to be processed. However, for example, when documents are classified and managed according to respective expiration dates for storage, the document storage apparatus 300 checks the expiration dates for storage of not all stored documents. For example, the apparatus does not check the expiration dates for storage of stored documents that belong to groups whose expiration dates for storage apparently do not expire.

As described above, with the arrangement according to this embodiment, image data of a document is analyzed to automatically retrieve information such as the document type, date of creation, creator, and the like. Then, document management including an automatic calculation of the storage period is applied to each document based on the retrieved information and the table that manages the storage periods for respective document types. For this reason, the arrangement according to this embodiment can provide the document management technique that includes setting and management of the storage periods of documents and can reduce the user's manual operations.

Second Embodiment

In the arrangement according to the first embodiment, an expiration date for storage is set upon inputting a document.

However, the storage period of a document may be changed after the document is input. A change in storage period includes changes based on a legal change etc. With the arrangement according to this embodiment, in place of setting the expiration date for storage upon inputting a document, the date of creation of a document is detected upon input, and the expiration date for storage is calculated based on the date of creation of the document and the storage period table upon checking the expiration date for storage. As a result, if the storage period is changed after the document is input, document management including deletion of the document and the like can be made based on the changed storage period.

(System Arrangement)

Figure 8:
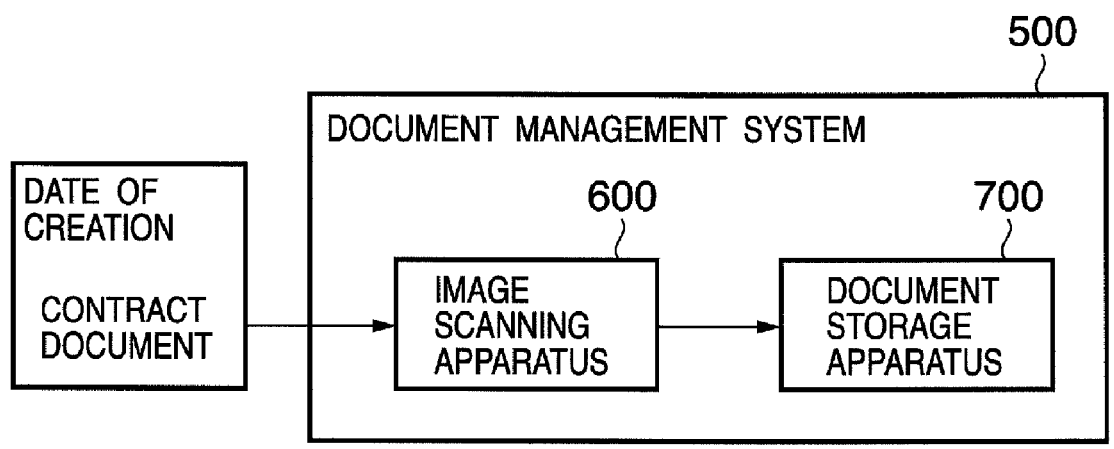
FIG. 8 is a block diagram showing the arrangement of a document management system.

FIG. 8 is a block diagram showing the arrangement of a document management system according to the second embodiment. As shown in FIG. 8, a document management system 500 according to this embodiment also comprises an image scanning apparatus 600 and document storage apparatus 700. The document management system 500 according to this embodiment is also implemented by an information processing apparatus such as a personal computer (PC), workstation (WS), MFP, or the like. The hardware arrangement of the information processing apparatus is the same as that described in the first embodiment, and a description thereof will be omitted.

(Functional Arrangement of Image Scanning Apparatus 600)

Figure 9:
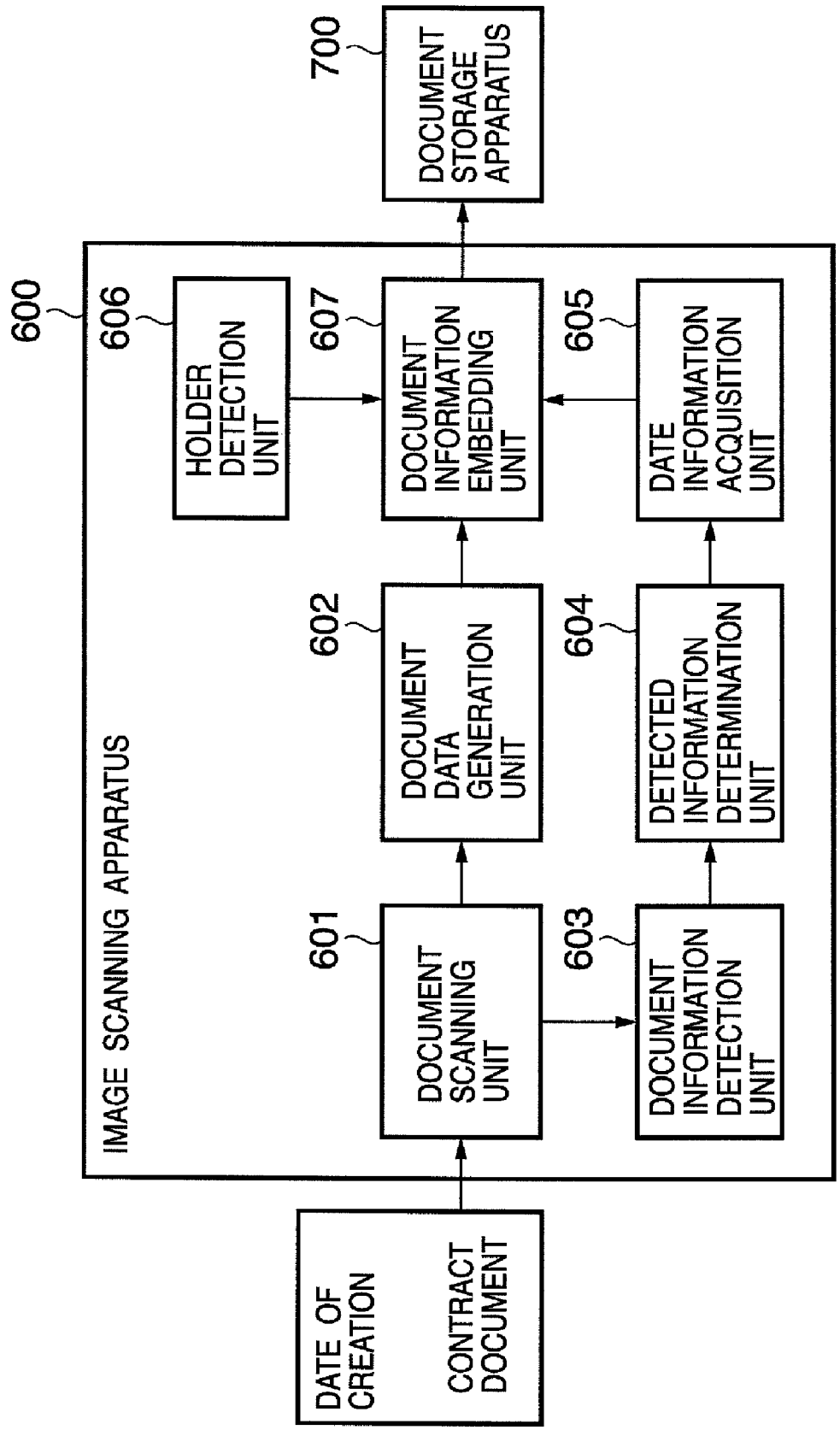
FIG. 9 is a block diagram showing the functional arrangement of an image scanning apparatus.

FIG. 9 is a block diagram showing the functional arrangement of the image scanning apparatus 600. As shown in FIG. 9, the image scanning apparatus 600 comprises a document scanning unit 601, document data generation unit 602, document information detection unit 603, detected information determination unit 604, date information acquisition unit 605, holder detection unit 606, and document information embedding unit 607.

Respective functional blocks shown in FIG. 9 are implemented when the CPU 990 of the information processing apparatus described above with reference to FIG. 19 executes the programs loaded onto the RAM 992 in cooperation with the respective hardware components shown in FIG. 19. Of course, some or all of the functional blocks may be implemented by dedicated hardware.

The document scanning unit 601, document data generation unit 602, document information detection unit 603, detected information determination unit 604, and date information acquisition unit 605 have the same functions as those that form the image scanning apparatus 200 described in the first embodiment, and a description thereof will be omitted. The holder detection unit 606 has a function of specifying a holder of the scanned document using the authentication function of the image scanning apparatus such as an MFP or the detection function of the document information detection unit 603, and is the same as the holder detection unit 209 of the arrangement according to the first embodiment.

The document information embedding unit 607 has a function of embedding (appending) information obtained by the document information detection unit 603 and holder detection unit 606 in electronic data generated by the document data generation unit 602. The information can be embedded by storing the information in the header of electronic data or using a digital watermark. Since the image scanning apparatus 600 of this embodiment does not include any functional element for calculating the expiration date for storage, it is different from that of the arrangement according to the first embodiment in that the information to be embedded does not include any expiration date for storage.

(Functional Arrangement of Document Storage Apparatus 700)

Figure 10:
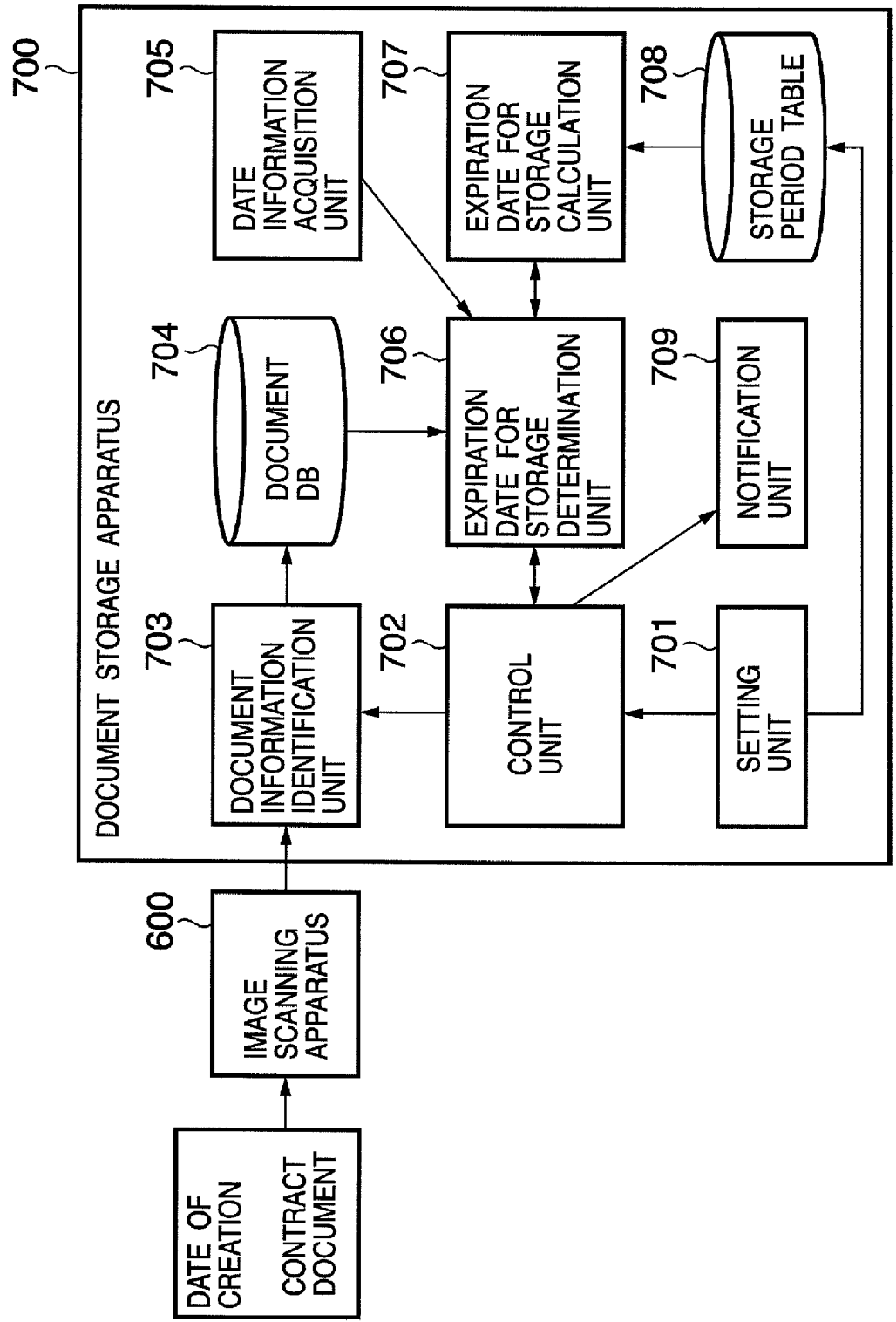
FIG. 10 is a block diagram showing the functional arrangement of a document storage apparatus.

The functional arrangement of the document storage apparatus 700 will be described below with reference to FIG. 10. FIG. 10 is a block diagram showing the functional arrangement of the document storage apparatus 700. As shown in FIG. 10, the document storage apparatus 700 comprises a setting unit 701, control unit 702, document information identification unit 703, document DB 704, date information acquisition unit 705, expiration date for storage checking unit 706, expiration date for storage calculation unit 707, storage period table 708, and notification unit 709.

Respective functional blocks shown in FIG. 10 are also implemented when the CPU 990 of the information processing apparatus described above with reference to FIG. 19 executes the programs loaded onto the RAM 992 in cooperation with the respective hardware components shown in FIG. 19. Of course, some or all of the functional blocks may be implemented by dedicated hardware.

The document information identification unit 703, document DB 704, date information acquisition unit 705, expiration date for storage calculation unit 707, storage period table 708, and notification unit 709 have the same functions as those that form the image scanning apparatus 200 and document storage apparatus 300 described in the first embodiment.

The setting unit 701 has a function of setting the document types and storage periods in the storage period table 708 in addition to classified storage of documents, the cycle for checking expiration dates for storage, the processing method of documents, and the like. When the storage period of a given document type is changed, the contents of the storage period table 708 are set and changed based on an external input signal. The external input signal includes a signal input in response to a user's instruction input as a trigger in addition to signals via communications from external apparatuses. When the user sets the changed storage period, he or she performs the following processing. That is, when the storage period of a given document type is changed, the user sets the changed storage period using the setting unit 701. The document storage apparatus 700 updates the storage period table 708 based on the information set in the setting unit 701. When the user sets the storage period, the arrangement according to this embodiment requires the user to perform only the setting operation of the storage period via the setting unit 701 upon changing the storage period.

In this embodiment, since the expiration date for storage is not appended to each document, documents cannot be set to be classified for respective expiration dates for storage. The control unit 702 has a function of controlling the document management method based on the information set in the setting unit 701. The expiration date for storage checking unit 706 compares the expiration date for storage calculated by the expiration date for storage calculation unit 707 and the current date acquired by the date information acquisition unit 705 to see based on the cycle set in the setting unit 701 if the expiration date for storage has expired.

(Document Scanning Processing)

Figure 11:
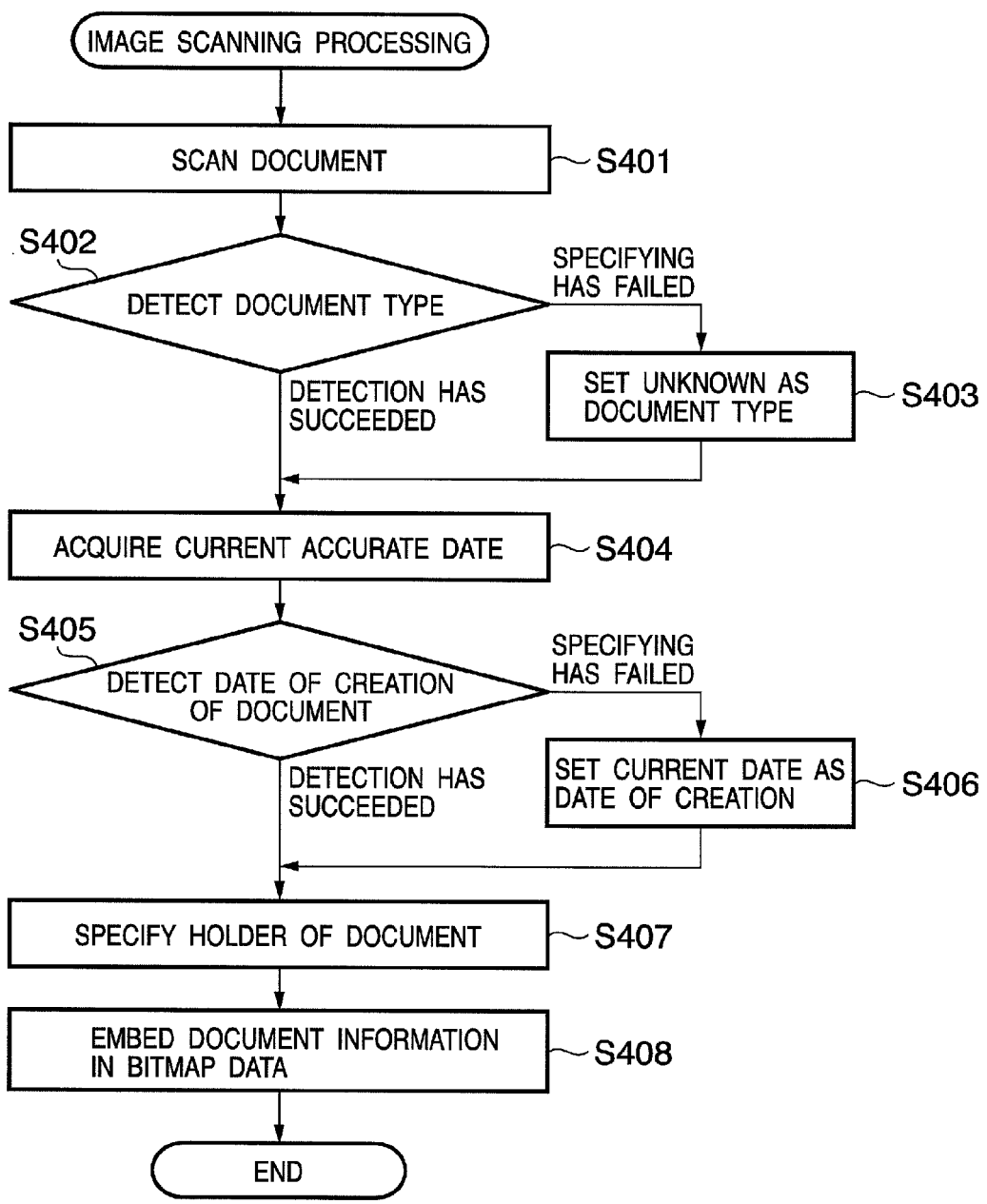
FIG. 11 is a flowchart showing the procedure of document scanning processing.

The document scanning processing of the image scanning apparatus 600 in the aforementioned document management system 500 according to this embodiment will be described with reference to FIG. 11. FIG. 11 is a flowchart showing the procedure of the document scanning processing.

The document scanning unit 601 scans a document based on an instruction input of a document holder (step S401). The document is scanned using an image input device such as the scanner device 994 or the like. At this time, the document data generation unit 602 generates bitmap data based on information scanned by the document scanning unit 601.

After the document is scanned by the document scanning unit 601, the document information detection unit 603 and detected information determination unit 604 detect the document type (step S402) as in the arrangement according to the first embodiment. The document type detection technique may use technique that using OCR or the layout information etc. The document type detection is executed so as to detect one of the types set in the storage period (setting) table 708. For example, the type such as a contract document, receipt, or the like is detected. That is, the image scanning apparatus 600 has information associated with candidates of document types such as a contract document, receipt, and the like, and executes the type detection processing based on this information.

If detection of the document type has failed ("specifying has failed" in step S402), the process advances to step S403 to detect that document type as "Tunknown". The process then advances to step S404. If detection of the document type has succeeded in step S402 ("detection has succeeded" in step S402), the process also advances to step S404.

In step S404, the image scanning apparatus 600 acquires a current accurate date using the date information acquisition unit 605. The date information acquisition unit 605 provides accurate standard time information. The date information acquisition unit 605 can be implemented using an authentication server that provides a time stamp service, GPS (Global Positioning System), wave clock, NTP (Network Time Protocol), or the like. Since these techniques are known to those who are skilled in the art, a detailed description thereof will be omitted. The date can include accurate time information in addition to information of year, month, and day.

After the accurate date is acquired in step S404, the document information detection unit 603 attempts to detect the date of creation of the document (step S405). The date of creation can be detected using the OCR or layout information as in step S402. The detection processing is executed so that the information of the date of creation of the document includes information of year/month/day. As a result of the processing in step S405, if detection of the date of creation of the document has failed ("specifying has failed" in step S405), the process advances to step S406 to set the date of scanning of that document as its date of creation. The process then advances to step S407. If detection of the date of creation of the document has succeeded ("detection has succeeded" in step S405), the process also advances to step S407.

In step S407, the holder detection unit 606 detects information representing the holder of the scanned document. Detection of the information representing the holder of the document may use the authentication function of the image scanning apparatus such as an MFP or the like, or may be executed by the document information detection unit 603 as in the document type and date of creation. The information representing the holder of the document can include the name and contact address (e.g., an e-mail address or the like) of the holder of the document. With the arrangement according to this embodiment, the information representing the holder of the document is used to, e.g., notify the holder that the document whose storage period has expired if such document is found. For this reason, the information representing the holder of the document need not always be his or her contact address as long as a notified party who requires contact upon elapse of the storage period of the document can be specified. Note that such function is not indispensable, and the processing in step S407 can be omitted if it is not particularly required.

After the processing in step S407, the document information embedding unit 607 embeds (appends) document information such as the detected document type, date of creation, and holder in the bitmap data generated by the document data generation unit 602 in step S408. The document information can be embedded by storing the document information in the header of the bitmap data. Alternatively, the document information may be embedded using a digital watermarking technique or the like. After the document information embedding processing, the bitmap data appended with the document information is output to the document storage apparatus 700, thus ending the processing.

(Document Storage Processing)

The processing to be executed by the document storage apparatus 700 in the document management system 500 in this embodiment will be described below. The document storage apparatus 700 manages documents in the form of setting the management method of a document as the management method setting function, storing the document based on the set management method as the document storage function, and processing the document by checking the expiration date for storage of the document as the expiration date for storage checking function, as described in the first embodiment. The management method setting function, document storage function, and expiration date for storage checking function will be described in detail below.

The management method setting function of a document will be described first. The document storage apparatus 700 must set the classification method upon storing documents, the processing to be executed when the storage period of a document has elapsed, and the cycle for checking the expiration dates for storage of documents as in the first embodiment. These settings are the same as those in the first embodiment, and a detailed description thereof will be omitted. In this embodiment, the setting unit 701 makes these settings. Furthermore, the setting unit 701 of this embodiment has a function of setting the document types and storage periods in the storage period table. In the first embodiment, the image scanning apparatus 200 and document storage apparatus 300 must independently set necessary information. However, in this embodiment, the setting unit 701 can set necessary information at the same time.

Figure 12:
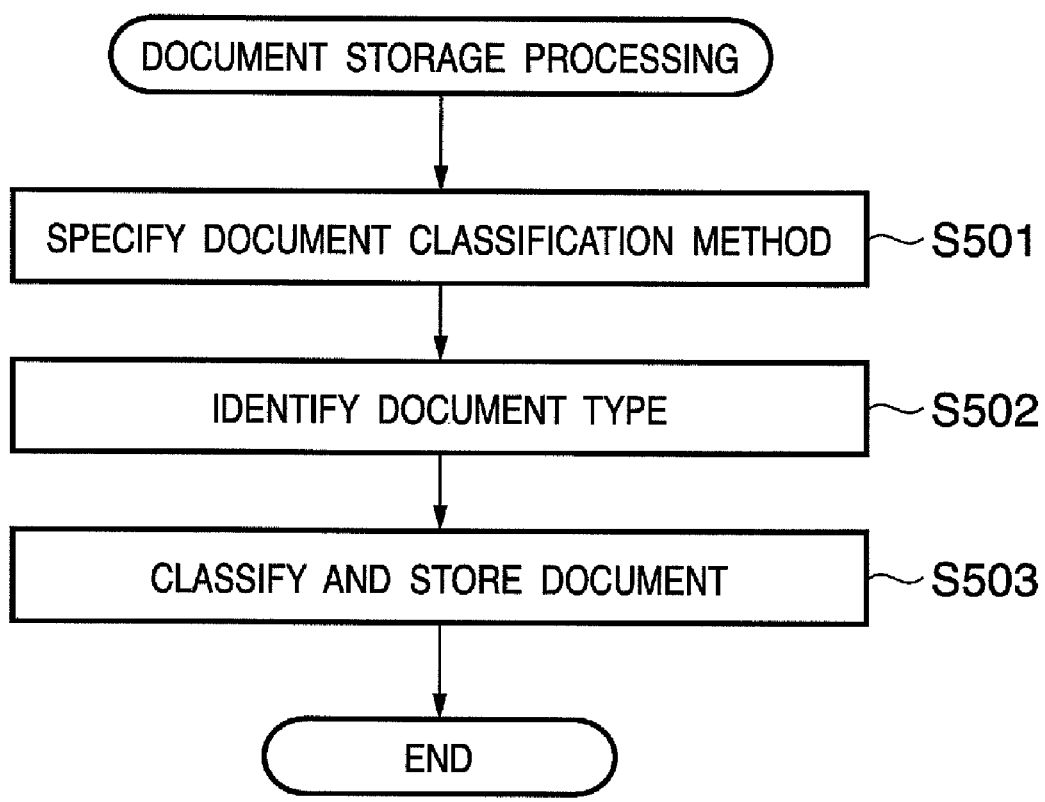
FIG. 12 is a flowchart showing the procedure of document storage processing.

The document storage processing to be executed by the document storage apparatus 700 in the document management system 500 of this embodiment will be described below with reference to FIG. 12. FIG. 12 is a flowchart showing the procedure of the document storage processing.

Upon reception of a document output from the image scanning apparatus 600, the document storage apparatus 700 stores the received document. When the document storage apparatus 700 stores the document, it specifies the document classification method under the control of the control unit 702 (step S501). The control unit 702 specifies the classification method based on the setting of the setting unit 701. The document classification method includes those depending on document types, holders, and the like.

If the document classification method is specified in step S501, the document information identification unit 703 identifies document information appended to the document (step S502). For example, if the classification method is the type-dependent method, the document information identification unit 703 identifies whether the type of that document is a contract document, receipt, or the like.

If the document information is identified in step S502, the document is classified based on the identified information and is stored in the document DB 704 (step S503). If the classification method is the document type-dependent or holder-dependent method, a folder is generated for each document type or holder to store the document. However, in this embodiment, since the expiration date for storage is not appended to the document, the document cannot be set to be classified for each expiration date for storage.

Expiration Date for Storage Checking Processing)

Figure 13:
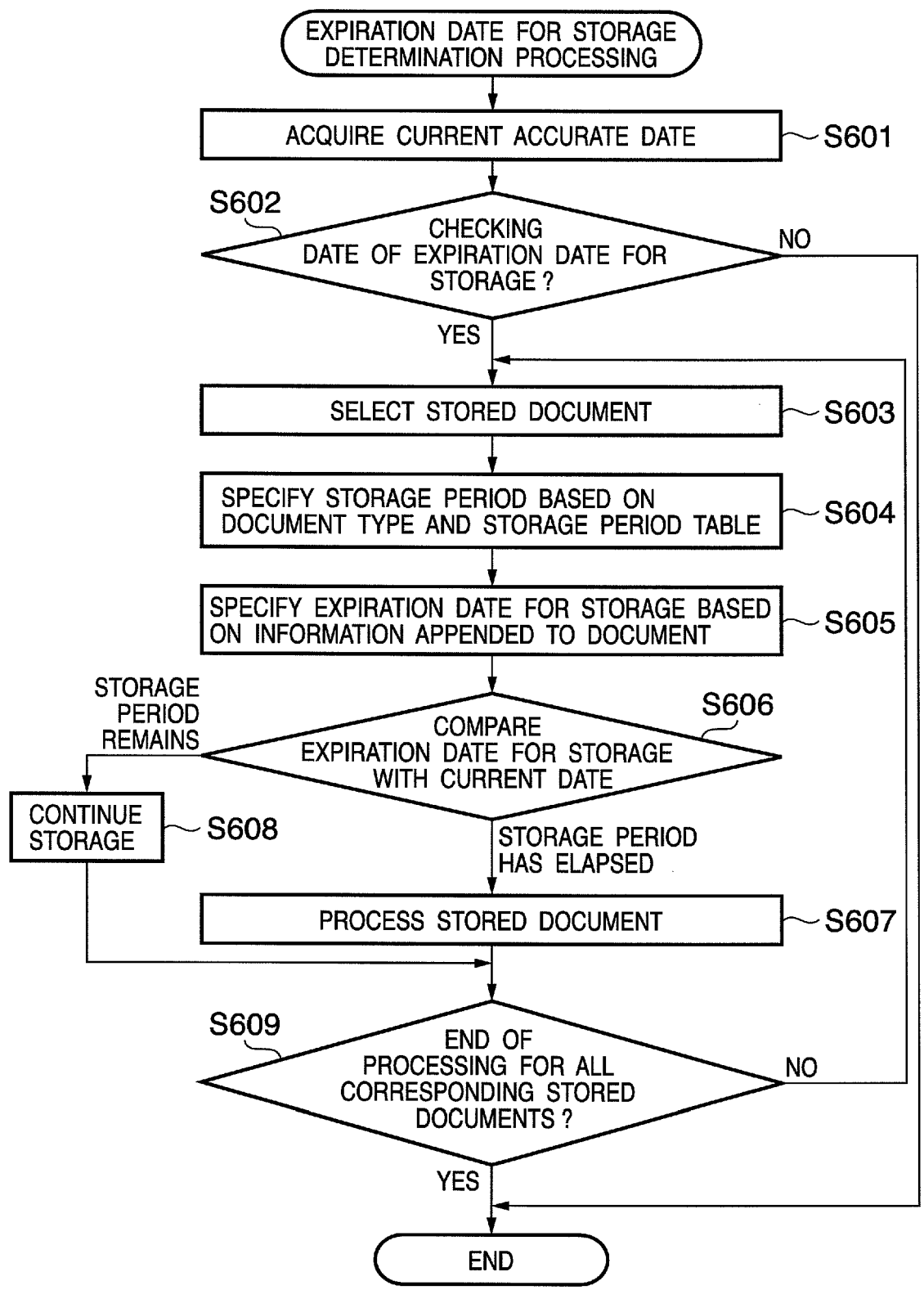
FIG. 13 is a flowchart showing the procedure for checking the expiration date for storage.

The expiration date for storage checking processing to be executed by the document storage apparatus 700 in the document management system 500 of this embodiment will be described below with reference to FIG. 13. FIG. 13 is a flowchart showing the procedure of the expiration date for storage checking processing. In this embodiment, assume that documents are classified and stored for respective types.

The document storage apparatus 700 acquires the current accurate date using the date information acquisition unit 705 first (step S601). Note that the date may include time in addition to year, month, and day.

The document storage apparatus 700 checks if the checking timing of the expiration dates for storage is reached (step S602). The control unit 702 controls whether or not the checking timing of the expiration dates for storage is reached, based on the storage cycle set by the setting unit 701. For example, if the storage cycle is set to be every day, the expiration dates for storage must be checked every day. If the storage cycle is set to be every year, the expiration dates for storage need only be checked once per year. As a result of checking the checking timing of the expiration date for storage, if it is determined that the checking timing is not reached (NO in step S602), the expiration date for storage checking processing ends. On the other hand, if it is determined in step S602 that the checking timing of the expiration dates for storage is reached (YES in step S602), the process advances to step S603.

In steps S603 to S609, the document storage apparatus 700 checks the expiration dates for storage of all documents stored in the document storage apparatus 700, i.e., it executes processing based on comparison results between their expiration dates for storage and execution dates of processing using the expiration date for storage checking unit 706.

The expiration date for storage checking unit 706 selects stored documents that have not undergone processing based on the checking result of the expiration dates for storage one by one (step S603). In this embodiment, documents are classified and stored for respective types, and the expiration dates for storage of all the stored documents are checked.

In steps S604 and S605, the expiration date for storage checking unit 706 calculates an expiration date for storage using the expiration date for storage calculation unit 707. In step S604, the expiration date for storage calculation unit 707 searches the storage period table 708 based on the document type appended to the document, and specifies a storage period corresponding to the document type. After the document storage period is specified, the expiration date for storage calculation unit 707 specifies the expiration date for storage of the document by adding the storage period specified in step S604 to the date of creation of the document appended to the document in step S605.

If the expiration date for storage of the document is specified, the expiration date for storage checking unit 706 compares the current date acquired by the date information acquisition unit 705 with the expiration date for storage (step S606). If the current date has passed the expiration date for storage ("storage period has elapsed" in step S606), the process advances to step S607; otherwise ("storage period remains" in step S606), the process advances to step S608.

In step S608, the document storage apparatus 700 continues storage of the document. That is, the document storage apparatus 700 does not especially execute processing while the document is stored in the storage device. The process then advances to step S609.

On the other hand, in step S607 the document storage apparatus 700 processes the document in accordance with the control information of the control unit 702. As the processing method of the document, for example, the document may be automatically deleted, the storage period of that document may be extended, or if the holder detection unit 606 has specified the holder, the apparatus may notify the holder using an e-mail message or the like. The process then advances to step S609.

The document storage apparatus 700 checks in step S609 if the expiration dates for storage of all stored documents have been checked, i.e., the processes in steps S604 to S608 have been executed for them. If checking of the expiration dates for storage of all the stored documents is complete (YES in step S609), all the processes end.

If documents whose expiration dates for storage are to be checked still remain (NO in step S609), the process returns to step S603 to check the expiration date for storage of the next stored document to be processed.

As described above, with the arrangement according to this embodiment, the date of creation of a document is detected upon inputting the document, and the expiration date for storage is calculated based on the date of creation of the document and the storage period table upon checking the expiration date for storage, in place of setting the expiration date for storage upon inputting the document. In this way, even when the storage period of a document is changed due to, e.g., law amendment or the like, the document management based on the changed storage period can be made by updating the storage period table. In the arrangement according to the first embodiment, the image scanning apparatus 200 and document storage apparatus 300 must independently set necessary information. However, in this embodiment, the setting unit 701 can set necessary information at the same time.

Third Embodiment

The third embodiment will explain a document management system in which an image scanning apparatus does not perform detection of the document type and date of creation, and a calculation of the expiration date for storage unlike those of the first and second embodiments. That is, in this embodiment, the image scanning apparatus performs only a normal document scanning operation and detection of a holder, and the document storage apparatus performs detection of the document type and date of creation, and the calculation of the expiration date for storage, that are executed by the image scanning apparatus in the first or second embodiment. In this manner, with the arrangement according to this embodiment, since the document storage apparatus performs all the processes, settings, and the like associated with detection of document information and document management, a document management system can be implemented using a conventional image scanning apparatus.

(System Arrangement)

Figure 14:
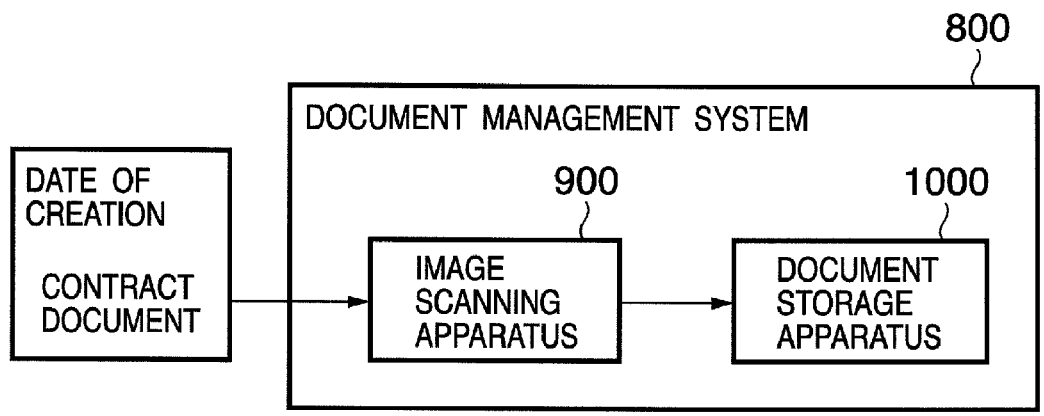
FIG. 14 is a block diagram showing the arrangement of a document management system.

FIG. 14 is a block diagram showing the arrangement of a document management system according to the third embodiment. As shown in FIG. 14, a document management system 800 according to this embodiment also comprises an image scanning apparatus 900 and document storage apparatus 1000. The document management system 800 according to this embodiment is also implemented by an information processing apparatus such as a personal computer (PC), workstation (WS), MFP, or the like. The hardware arrangement of the information processing apparatus is the same as that described in the first embodiment, and a description thereof will be omitted.

(Functional Arrangement of Image Scanning Apparatus 900)

Figure 15:
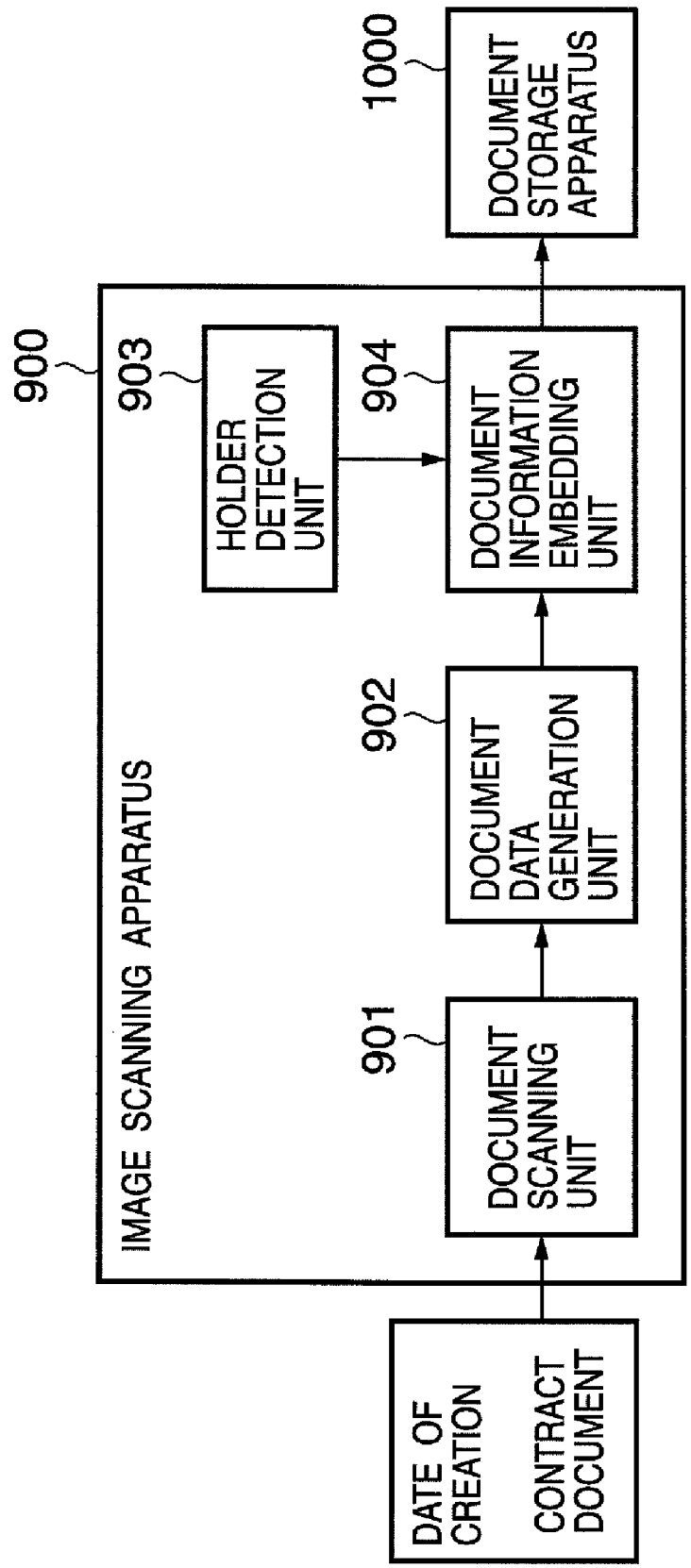
FIG. 15 is a block diagram showing the functional arrangement of an image scanning apparatus.

FIG. 15 is a block diagram showing the functional arrangement of the image scanning apparatus 900. As shown in FIG. 15, the image scanning apparatus 900 comprises a document scanning unit 901, document data generation unit 902, holder detection unit 903, and document information embedding unit 904.

Respective functional blocks shown in FIG. 15 are implemented when the CPU 990 of the information processing apparatus described above with reference to FIG. 19 executes the programs loaded onto the RAM 992 in cooperation with the respective hardware components shown in FIG. 19. Of course, some or all of the functional blocks may be implemented by dedicated hardware.

The document scanning unit 901 and document data generation unit 902 have the same functions as those that form the image scanning apparatus 200 described in the first embodiment. The holder detection unit 903 has a function of specifying a holder of the scanned document using the authentication function of the image scanning apparatus such as an MFP. The document information embedding unit 904 of this embodiment has a function of embedding (appending) only information obtained by the holder detection unit 903 in electronic data generated by the document data generation unit 902. The information can be embedded by storing the information in the header of electronic data or using a digital watermark.

(Functional Arrangement of Document Storage Apparatus 1000)

Figure 16:
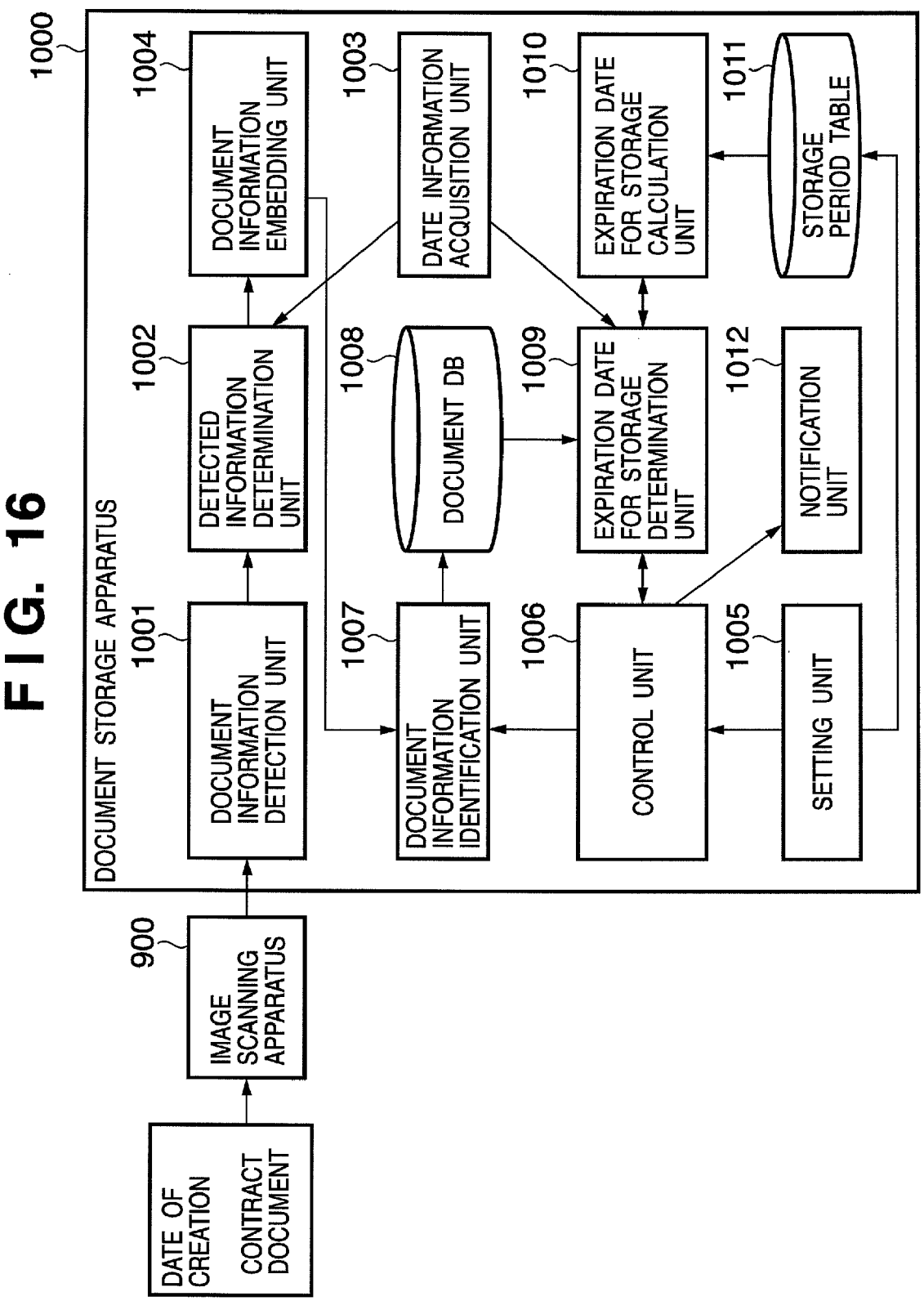
FIG. 16 is a block diagram showing the functional arrangement of a document storage apparatus.

The functional arrangement of the document storage apparatus 1000 will be described below with reference to FIG. 16. FIG. 16 is a block diagram showing the functional arrangement of the document storage apparatus 1000. As shown in FIG. 16, the document storage apparatus 1000 comprises the following functional elements:
 a document information detection unit 1001;
 a detected information determination unit 1002;
 a date information acquisition unit 1003;
 a document information embedding unit 1004;
 a setting unit 1005;
 a control unit 1006;
 a document information identification unit 1007;
 a document DB 1008;
 an expiration date for storage checking unit 1009;
 an expiration date for storage calculation unit 1010;
 a storage period table 1011; and
 a notification unit 1012.

Respective functional blocks shown in FIG. 16 are also implemented when the CPU 990 of the information processing apparatus described above with reference to FIG. 19 executes the programs loaded onto the RAM 992 in cooperation with the respective hardware components shown in FIG. 19. Of course, some or all of the functional blocks may be implemented by dedicated hardware.

The following functional elements have the same functions as those that form the image scanning apparatus 200 or 600 or the document storage apparatus 300 or 700 described in the first or second embodiment:
 the document information detection unit 1001;
 the detected information determination unit 1002;
 the date information acquisition unit 1003;
 the document information identification unit 1007;
 the document DB 1008;
 the expiration date for storage calculation unit 1010;
 the storage period table 1011; and
 the notification unit 1012.

The document information embedding unit 1004 has a function of embedding (appending) information obtained by the document information detection unit 1001 and detected information determination unit 1002 in electronic data generated by the document data generation unit 902 in the image scanning apparatus 900. The information can be embedded by storing the information in the header of electronic data or using a digital watermark. The setting unit 1005 has a function of setting the document types and storage periods in the storage period table 1011 in addition to classified storage of documents, the cycle for checking expiration dates for storage, the processing method of documents, and the like. However, in this embodiment, since the expiration date for storage is not appended to each document, documents cannot be set to be classified for respective expiration dates for storage. The control unit 1006 has a function of controlling the document management method based on the information set in the setting unit 1005. The expiration date for storage checking unit 1009 compares the expiration date for storage calculated by the expiration date for storage calculation unit 1010 and the current date acquired by the date information acquisition unit 705 to see based on the cycle set in the setting unit 1005 if the expiration date for storage has expired.

(Document Scanning Processing)

Figure 17:
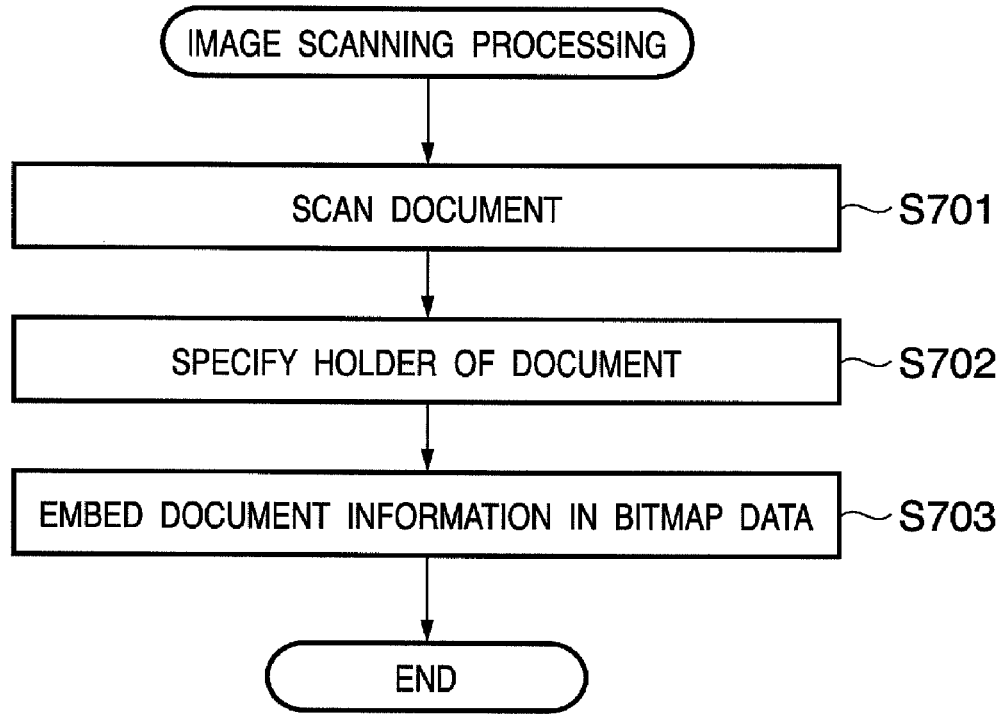
FIG. 17 is a flowchart showing the procedure of document scanning processing.

The document scanning processing of the image scanning apparatus 900 in the aforementioned document management system 800 according to this embodiment will be described with reference to FIG. 17. FIG. 17 is a flowchart showing the procedure of the document scanning processing.

In the arrangement according to this embodiment, the image scanning apparatus 900 does not perform detection of the document type and date of creation, and the calculation of the expiration date for storage unlike in the document management systems of the first and second embodiment. That is, in this embodiment, the image scanning apparatus 900 performs only a normal document scanning operation and detection of a holder.

The document scanning unit 901 scans a document based on an instruction input of a document holder (step S701). The document is scanned using an image input device such as the scanner device 994 or the like. At this time, the document data generation unit 902 generates bitmap data based on information scanned by the document scanning unit 901.

After the document is scanned by the document scanning unit 901, the holder detection unit 903 detects information representing the holder of the scanned document (step S702). The information representing the holder of the document can be detected using the authentication function of the image scanning apparatus such as password authentication or the like. The information representing the holder of the document can include the name and contact address (e.g., an e-mail address or the like) of the holder of the document. With the arrangement according to this embodiment, the information representing the holder of the document is used to, e.g., notify the holder that the document whose storage period has expired if such document is found. For this reason, the information representing the holder of the document need not always be his or her contact address as long as a notified party who requires contact upon elapse of the storage period of the document can be specified. Note that such function is not indispensable, and the processing in step S702 can be omitted if it is not particularly required.

After the processing in step S702, the document information embedding unit 904 embeds (appends) document information including the detected information of the holder in the bitmap data generated by the document data generation unit 902 in step S703. The document information can be embedded by storing the document information in the header of the bitmap data. Alternatively, the document information may be embedded using a digital watermarking technique or the like. After the document information embedding processing, the bitmap data appended with the document information is output to the document storage apparatus 1000, thus ending the processing.

(Document Storage Processing)

The processing to be executed by the document storage apparatus 1000 in the document management system 800 in this embodiment will be described hereinafter. The document storage apparatus 1000 sets the management method of a document as the management method setting function as in the arrangements according to the first and second embodiments. Also, the document storage apparatus 1000 manages documents in the form of storing the document based on the set management method as the document storage function, and processing the document by checking the expiration date for storage of the document as the expiration date for storage checking function. Such series of document management processes are the same as those in the first and second embodiments, and a detailed description thereof will be omitted.

Figure 18:
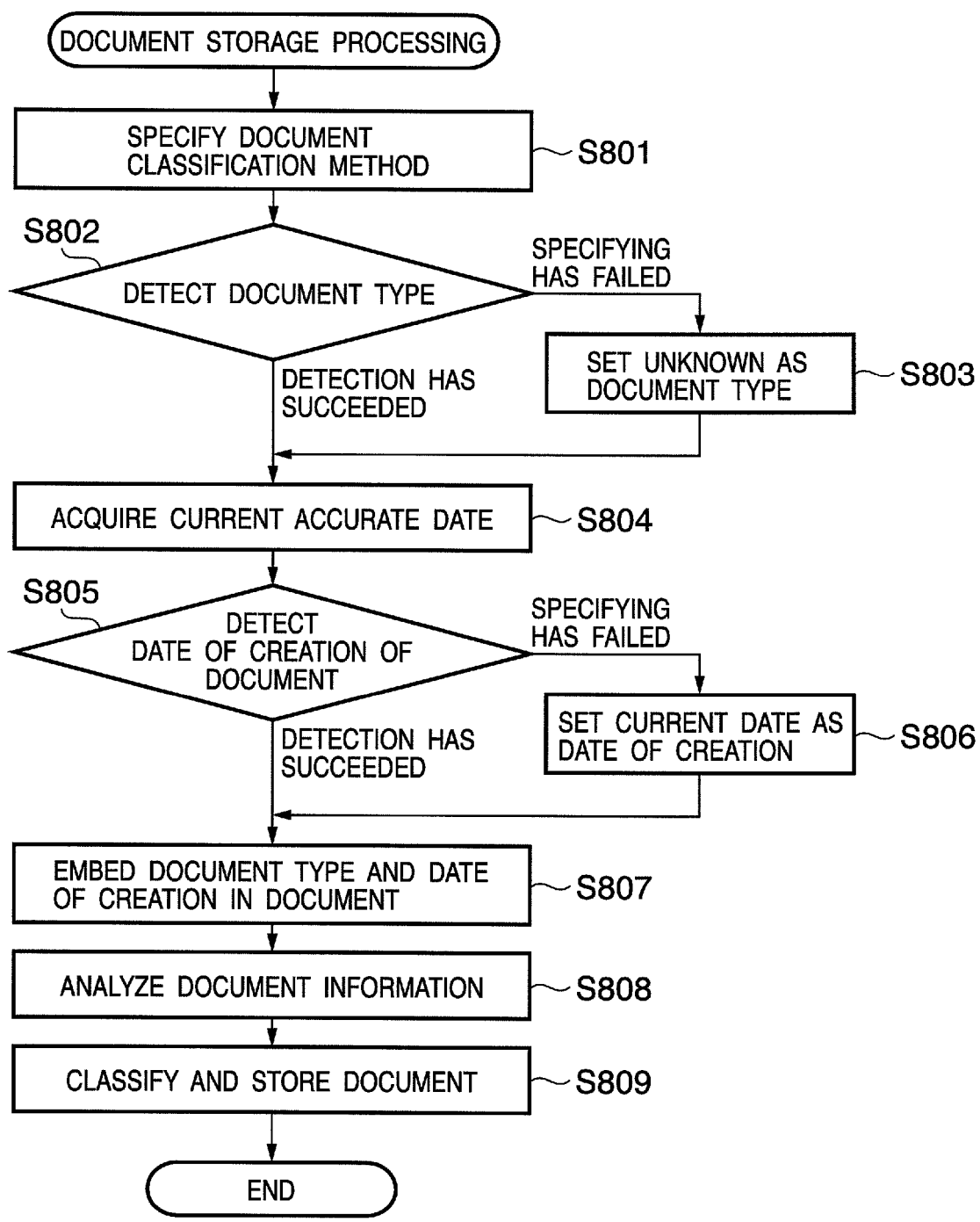
FIG. 18 is a flowchart showing the procedure of document storage processing.

The document storage processing to be executed by the document storage apparatus 1000 in the document management system 800 of this embodiment will be described below with reference to FIG. 18. FIG. 18 is a flowchart showing the procedure of the document storage processing.

Upon reception of a document output from the image scanning apparatus 900, the document storage apparatus 1000 stores the received document. When the document storage apparatus 1000 stores the document, it specifies the document classification method under the control of the control unit 1006 (step S801). The control unit 1006 specifies the classification method based on the setting of the setting unit 1005. The documents can be classified based on, e.g., holders.

If the document classification method is specified in step S801, the document information detection unit 1001 and detected information determination unit 1002 detects the document type (step S802). The document type detection technique may use technique that using OCR or the layout information as in the arrangements according to the first and second embodiments. If detection of the document type has failed ("specifying has failed" in step S802), the process advances to step S803 to detect that document type as "unknown". The process then advances to step S804. If detection of the document type has succeeded in step S802 ("detection has succeeded" in step S802), the process also advances to step S804.

In step S804, the document storage apparatus 1000 acquires a current accurate date using the date information acquisition unit 1003. The date information acquisition unit 1003 provides accurate standard time information. The date information acquisition unit 1003 can be implemented using an authentication server that provides a time stamp service, GPS (Global Positioning System), wave clock, NTP (Network Time Protocol), or the like. Since these techniques are known to those who are skilled in the art, a detailed description thereof will be omitted. The date can include accurate time information in addition to information of year, month, and day.

After the accurate date is acquired in step S804, the document information detection unit 1001 attempts to detect the date of creation of the document (step S805). The date of creation can be detected using the OCR or layout information as in step S802. The detection processing is executed so that the information of the date of creation of the document includes information of year/month/day. As a result of the processing in step S805, if detection of the date of creation of the document has failed ("specifying has failed" in step S805), the process advances to step S806 to set the date of scanning of that document as its date of creation. The process then advances to step S807. If detection of the date of creation of the document has succeeded ("detection has succeeded" in step S805), the process also advances to step S807.

In step S807, the document information embedding unit 1004 further embeds document information including the document type, date of creation, and the like in the bitmap data generated by the document data generation unit 902. The document information can be embedded by, e.g., storing the document information in the header of the bitmap data or using a digital watermark technique as in step S703.

Next, the document information identification unit 1007 analyzes the document information appended to the document to identify information such as the document type, date of creation, and holder (step S808) However, as the information of the document type and date of creation, a plurality of pieces of information acquired in steps S802, S803, S805, S806, and the like may be temporarily stored in a memory such as the RAM 992 or the like, and can be acquired by referring to the RAM 922.

In step S809, the document is classified based on the information identified in step S808, and is stored in the document DB 1008. In this embodiment, since the expiration date for storage is not appended to the document, the document cannot be set to be classified for each expiration date for storage.

(Expiration Date for Storage Checking Processing)

The expiration date for storage checking processing of the document storage apparatus 1000 in the document management system 800 of this embodiment will be described below. In this embodiment, assume that documents are classified and stored for respective types. The checking sequence of the expiration dates for storage is the same as that shown in FIG. 13 in the second embodiment, and a detailed description thereof will be omitted.

As described above, with the arrangement according to this embodiment, the image scanning apparatus performs a normal document scanning operation and the like, and the document storage apparatus performs detection of the document type and date of creation, and calculation of the expiration date for storage unlike in the document management system according to the first and second embodiments. In this manner, in the arrangement according to this embodiment, since the document storage apparatus performs all the processes, settings, and the like associated with detection of document information and document management, a document management system can be implemented using a conventional image scanning apparatus.

Fourth Embodiment

The document management system in each of the first, second, and third embodiments comprises two apparatuses, i.e., the image scanning apparatus and document storage apparatus. However, the present invention is not limited to such specific system arrangement. For example, a document management system may combine the two functions of the image scanning apparatus and document storage apparatus into one. With this arrangement, one apparatus can perform all processes from image scanning to document management. For this reason, according to the arrangement of this embodiment, the management method can be set simultaneously or flexibly according to different use purposes.

Other Embodiment

The preferred embodiments of the present invention have been explained, and the present invention can be practiced in the forms of a system, apparatus, method, program, storage medium, and the like. More specifically, the present invention can be applied to either a system constituted by a plurality of devices, or an apparatus consisting of a single equipment.

Note that the present invention includes a case wherein the invention is achieved by directly or remotely supplying a program that implements the functions of the aforementioned embodiments to a system or apparatus, and reading out and executing the supplied program code by a computer of that system or apparatus.

Therefore, the technical scope of the present invention includes the program code itself installed in a computer to implement the functional process of the present invention using the computer. That is, the present invention includes the computer program itself for implementing the functional processing of the present invention.

In this case, the form of program is not particularly limited, and an object code, a program to be executed by an interpreter, script data to be supplied to an OS, and the like may be used as long as they have the program function.

As a recording medium for supplying the program, for example, a floppy® disk, hard disk, optical disk, magneto-optical disk, MO, CD-ROM, CD-R, CD-RW, magnetic tape, nonvolatile memory card, ROM, DVD (DVD-ROM, DVD-R), and the like may be used.

As another program supply mode, the program may be supplied by establishing connection to a homepage on the Internet using a browser on a client device, and downloading the computer program according to the present invention or a compressed file including an automatic installation function from the homepage onto a recording medium such as an HD or the like. Also, the program code that forms the program of the present invention may be segmented into a plurality of files, that may be downloaded from different homepages. That is, the present invention includes a WWW server that makes a plurality of users download a program file required to implement the functional processing of the present invention by the computer.

Also, the following supply mode may be used. That is, a storage medium such as a CD-ROM or the like, that stores the encrypted program of the present invention, may be delivered to the users. The user who has cleared a predetermined condition may be allowed to download key information that decrypts the program from a homepage via the Internet, and the encrypted program may be executed using that key information to be installed on a computer, thus implementing the present invention. Such supply mode is also available.

In addition to implementation of the functions of the aforementioned embodiments by executing the readout program code by the computer, the following implementation mode is also assumed. That is, the functions of the aforementioned embodiments may be implemented by some or all of actual processing operations executed by an OS or the like running on the computer on the basis of an instruction of that program.

Furthermore, the program code read out from the storage medium is written in a memory of a function expansion board or a function expansion unit, that is inserted in or connected to the computer. After that, the functions of the above-mentioned embodiments may be implemented by some or all of actual processing operations executed by a CPU or the like arranged in the function expansion board or unit.

According to the present invention, a document management technique that includes setting and management of the document storage periods and can reduce user's manual operations can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims benefit of Japanese Patent Application No. 2005-339212, filed Nov. 24, 2005, which is hereby incorporated by reference herein in its entirety.

What is claimed is:

1. A document management system comprising:
an image scanning apparatus; and
a document management apparatus for managing images scanned by the image scanning apparatus,
wherein the image scanning apparatus comprises:
a scanning unit adapted to scan an image of a document;
a detection unit adapted to detect a document type and date of creation of document by analyzing image data of the document scanned by said scanning unit,
wherein said document type includes a receipt, a contract document, and/or a bill; and
an appending unit adapted to append the detected document type and the date of creation of document to the image data,
wherein if the detection unit fails to detect the document type, the appending unit appends unknown type to the image data as the document type, and if the detection unit fails to detect the date of creation of document, the appending unit appends the date of scanning of the document to the image data as the date of creation of document; and
wherein the document management apparatus comprises:
a storage unit adapted to store a storage period table describing a storage period of document for each document type, wherein said storage period of document is a legally-defined storage period for its document type, and wherein said storage period of document for the document of the unknown type is the legally-defined longest storage period;
a changing unit adapted to change the storage period in the storage period table;
a calculation unit adapted to retrieve the document type and the date of creation of document appended to the image data, specify the storage period described in the storage period table based on the retrieved document type, and calculate an expiration date for storage based on the specified storage period and the retrieved date of creation of document;
a determination unit adapted to determine whether or not the expiration date for storage has expired; and
a management unit adapted to execute, for image data for which it is determined that the expiration date for storage has expired, one of predetermined processings including deletion of image data, notification of expiration of the expiration date for storage, and continuation of storage.

2. The document management system according to claim 1, wherein the document management apparatus further comprises:

a database storing the image data, the image data being classified based on the document type appended to said image data.

3. A document management method comprising:

a scanning step of scanning an image of a document by an image scanning apparatus;

a detection step of detecting a document type and date of creation of document by analyzing image data of the document scanned in the scanning step, wherein said document type includes a receipt, a contract document, and/or a bill;

an appending step of appending the detected document type and the date of creation of document to the image data;

wherein if the detection of the document type is failed in the detection step, unknown type is appended to the image data as the document type in the appending step, and if the detection of the date of creation of document is failed in the detection step, the date of scanning of the document is appended to the image data as the date of creation of document in the appending step;

a retrieving step of retrieving, by a document management apparatus, the document type and the date of creation of document appended to the image data, wherein the document management apparatus comprises a storage unit adapted to store a storage period table describing a storage period of document for each document type and a changing unit adapted to change the storage period in the storage period table, wherein said storage period of document is a legally-defined storage period for its document type, and wherein said storage period of document for the document of the unknown type is the legally-defined longest storage period;

a specifying step of specifying the storage period described in the storage period table based on the document type retrieved in the retrieving step;

a calculating step of calculating an expiration date for storage based on the storage period specified in the specifying step and the date of creation of document retrieved in the retrieving step;

a determination step of determining whether or not the expiration date for storage has expired; and an executing step of executing, for image data for which it is determined in the determination step that the expiration date for storage has expired, one of predetermined processings including deletion of image data, notification of expiration of the expiration date for storage, and continuation of storage.

4. The document management method according to claim 3, further comprising:

storing, in a database of the document management apparatus, the image data, wherein the image data is classified based on the document type appended to said image data.

* * * * *